(12) United States Patent
Canot et al.

(10) Patent No.: US 7,748,507 B2
(45) Date of Patent: Jul. 6, 2010

(54) VEHICLE STRUCTURAL ELEMENT SERVING TO ABSORB CERTAIN SHOCKS BY PLASTIC DEFORMATION

(75) Inventors: Cyril Canot, Vitry-le-Francois (FR); Arnaud Cocu, Valenciennes (FR); Jean-Louis Colmont, Cergy Saint-Christophe (FR)

(73) Assignee: Vallourec Composants Automobiles Vitry, Vitry-le-Francois (FR)

( * ) Notice: Subject to any disclaimer, the term of this patent is extended or adjusted under 35 U.S.C. 154(b) by 0 days.

(21) Appl. No.: 10/558,411

(22) PCT Filed: May 21, 2004

(86) PCT No.: PCT/FR2004/001261

§ 371 (c)(1),
(2), (4) Date: Nov. 28, 2005

(87) PCT Pub. No.: WO2005/003587

PCT Pub. Date: Jan. 13, 2005

(65) Prior Publication Data

US 2006/0249342 A1    Nov. 9, 2006

(30) Foreign Application Priority Data

Jun. 6, 2003    (FR) .................................. 03 06888

(51) Int. Cl.
    *F16F 7/12* (2006.01)
(52) U.S. Cl. ...................................... 188/377; 293/133
(58) Field of Classification Search ............... 188/377, 188/371; 267/139; 280/784; 293/133; 296/187.03
    See application file for complete search history.

(56) References Cited

U.S. PATENT DOCUMENTS

| | | | | |
|---|---|---|---|---|
| 3,412,628 A | * | 11/1968 | De Gain ...................... | 74/492 |
| 3,495,474 A | * | 2/1970 | Nishimura et al. ........... | 74/492 |
| 3,616,126 A | * | 10/1971 | Tungseth .................... | 428/86 |
| 3,794,348 A | | 2/1974 | Fischer | |
| 4,190,276 A | * | 2/1980 | Hirano et al. ............... | 293/133 |
| 4,410,208 A | * | 10/1983 | Mulso et al. ................ | 293/132 |
| 4,646,504 A | | 3/1987 | Britvec ...................... | 52/655.2 |
| 4,702,515 A | * | 10/1987 | Kato et al. ............. | 296/187.01 |
| 5,118,160 A | * | 6/1992 | Kitagawa et al. ....... | 296/187.03 |
| 5,431,445 A | | 7/1995 | Wheatley | |
| 5,732,801 A | * | 3/1998 | Gertz ......................... | 188/377 |
| 6,695,393 B1 | * | 2/2004 | Aouadi et al. .......... | 296/187.09 |

(Continued)

FOREIGN PATENT DOCUMENTS

FR    2 782 305    2/2000

(Continued)

*Primary Examiner*—Robert A Siconolfi
*Assistant Examiner*—Vu Q Nguyen
(74) *Attorney, Agent, or Firm*—Oblon, Spivak, McClelland, Maier & Neustadt, L.L.P.

(57) ABSTRACT

A mechanical device including an elongated structural element provided for absorbing, at least in part, certain shocks by deformation. The structural element or piece has a selected right sectional profile, the profile being provided with localized alterations, shapes, and with selected respective positions for approximately satisfying a given law of deformation under the combined effort of compression in an axis of the piece and of the moment of the axis perpendicular to a plane passing through the axis. The law includes an energy absorption phase followed by a retraction of the piece.

20 Claims, 36 Drawing Sheets

U.S. PATENT DOCUMENTS

2002/0153719 A1\* 10/2002 Taguchi ..................... 280/784

FOREIGN PATENT DOCUMENTS

| FR | 2 824 523 | 11/2002 |
| --- | --- | --- |
| JP | 49-111332 | 10/1974 |
| JP | 07-101354 | 4/1995 |
| JP | 08-188174 | 7/1996 |
| WO | 98/39197 | 9/1998 |

\* cited by examiner

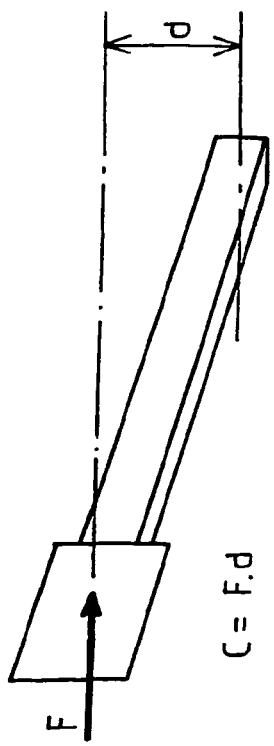
FIG. 2A
$C = F \cdot d$
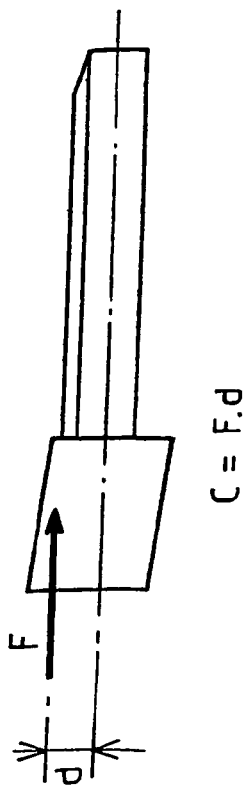
FIG. 2B
$C = F \cdot d$
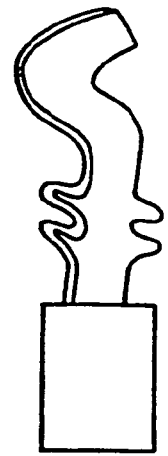
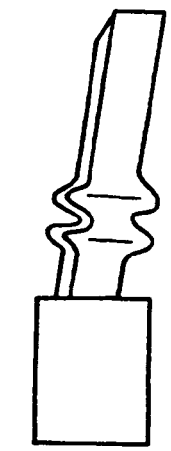
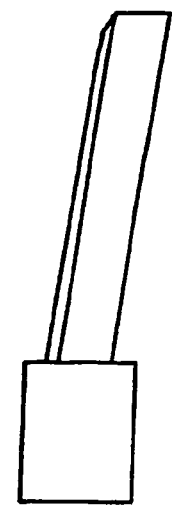
FIG. 3

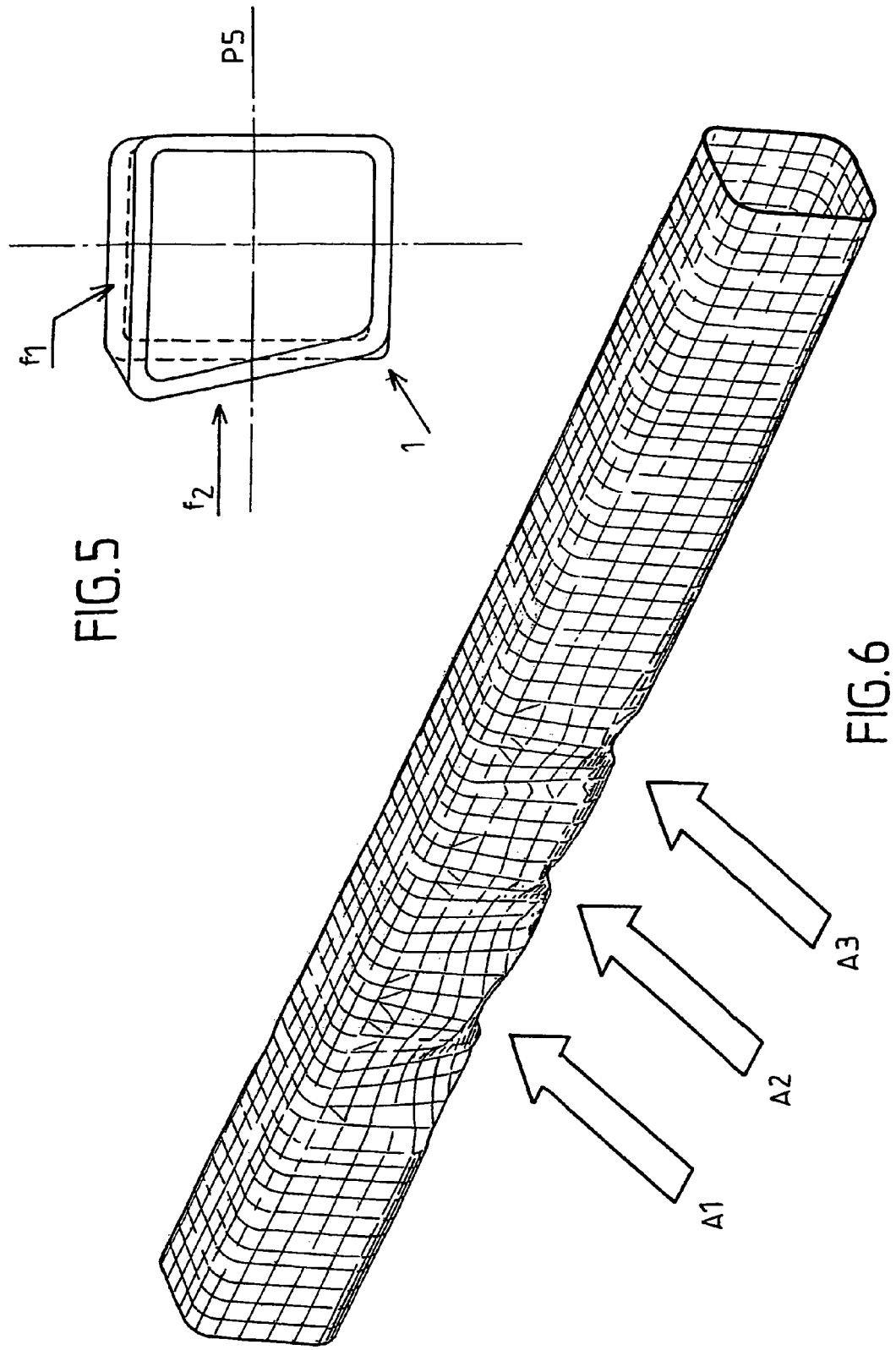

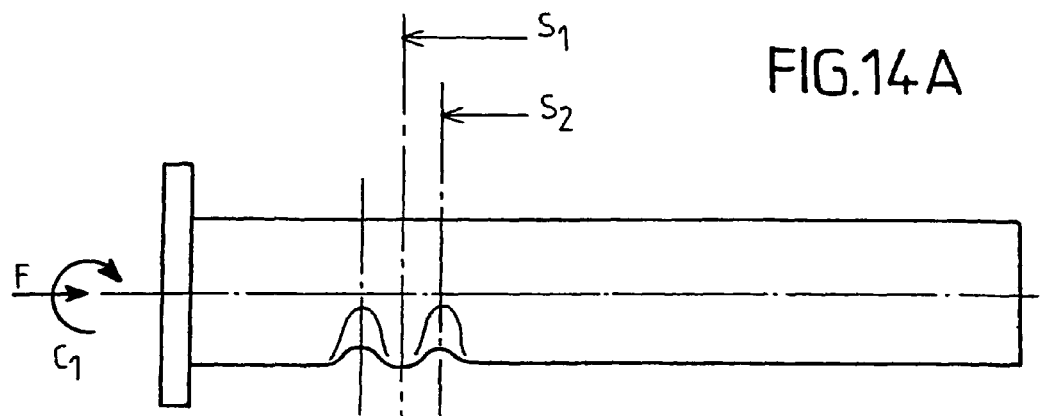
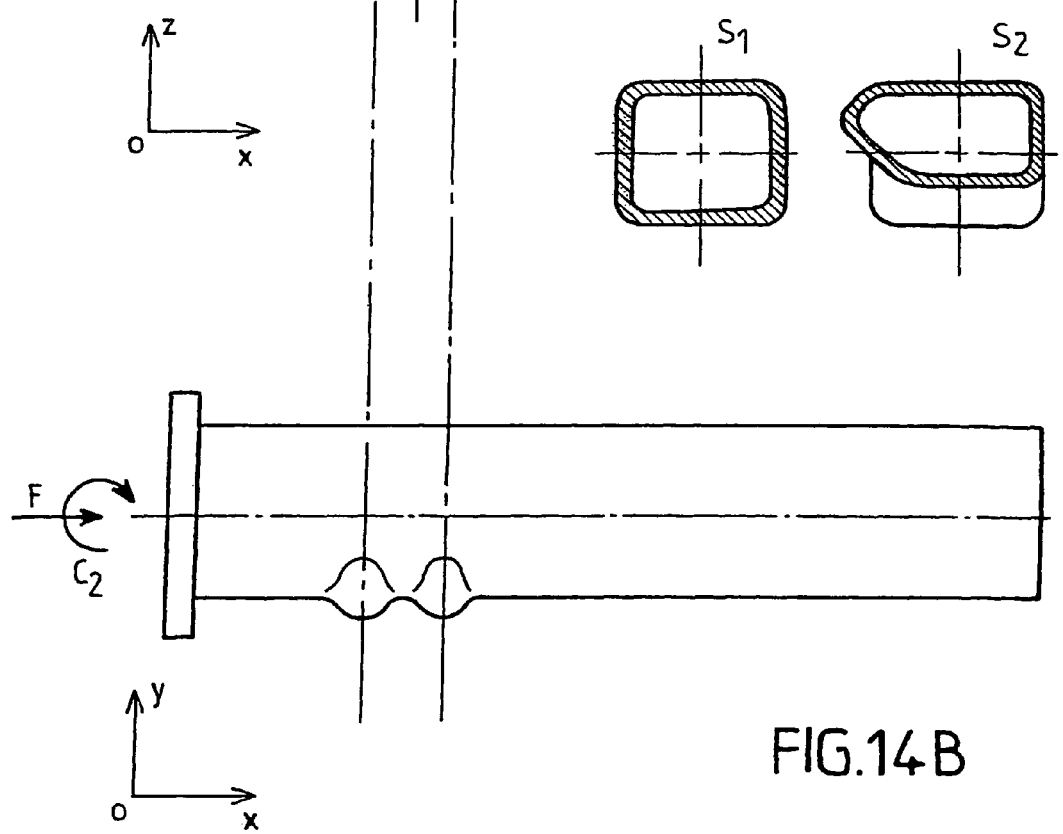
FIG.14A
FIG.14B view XZ
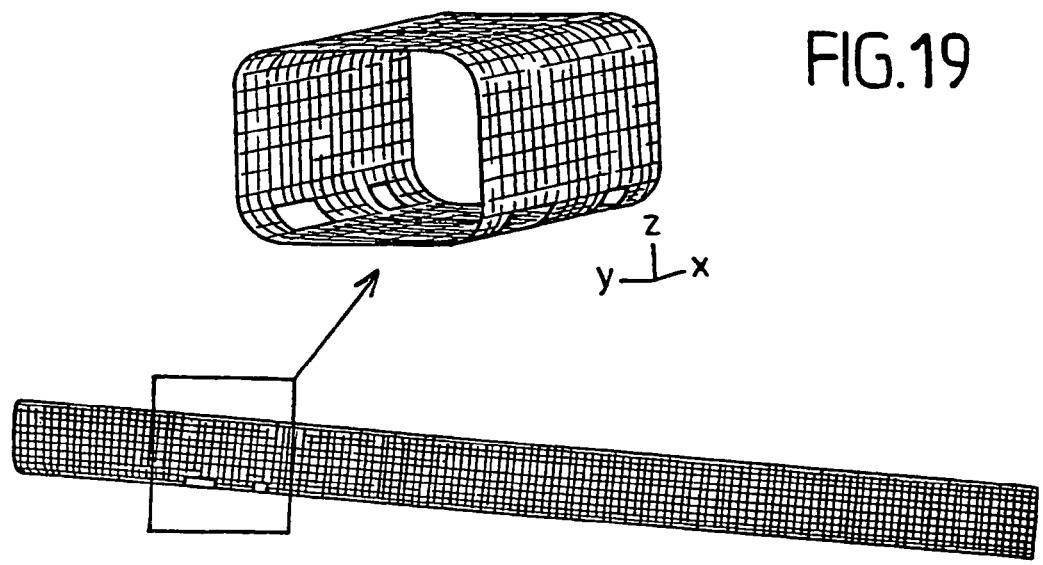
FIG.19
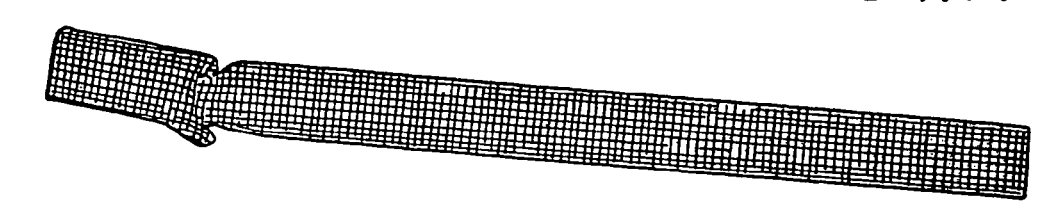
FIG.19A
FIG.19B
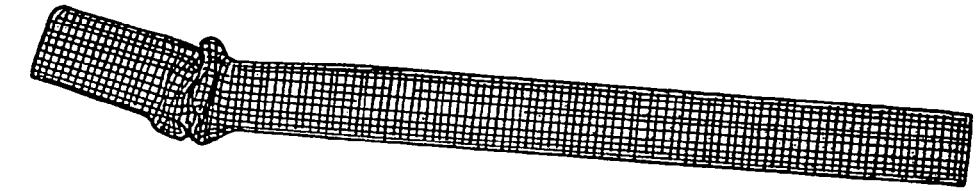
FIG.19C
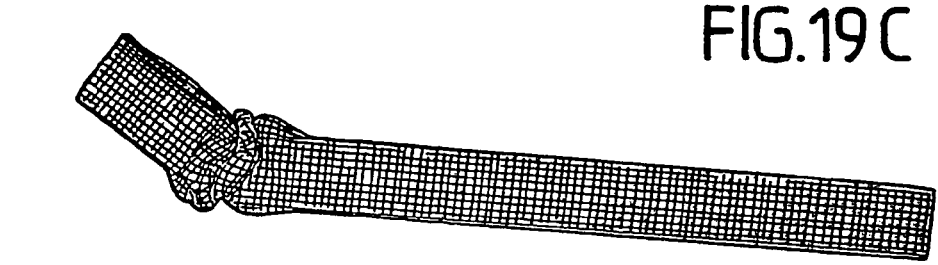
FIG.19D view XY
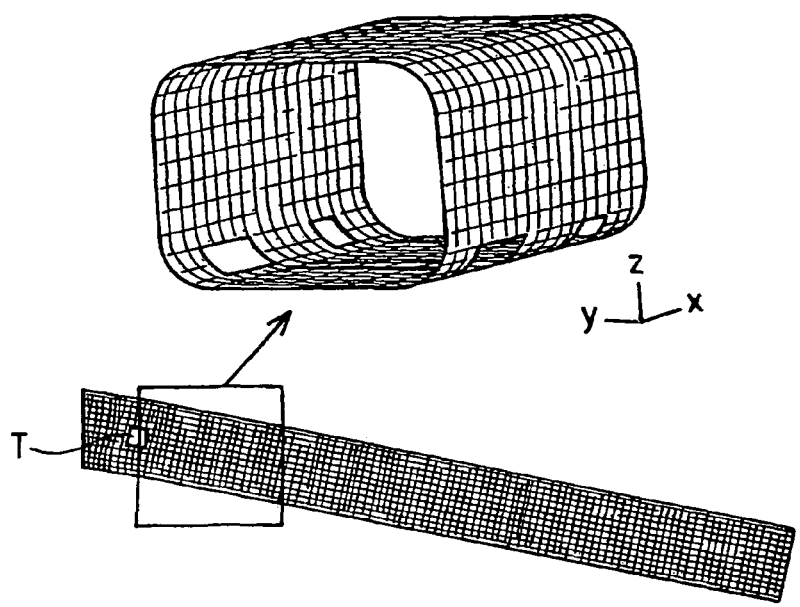
FIG. 20
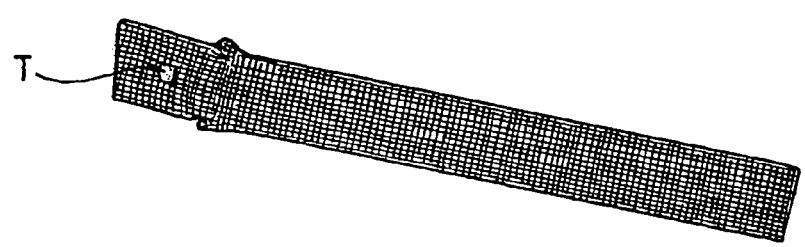
FIG. 20A
FIG. 20B
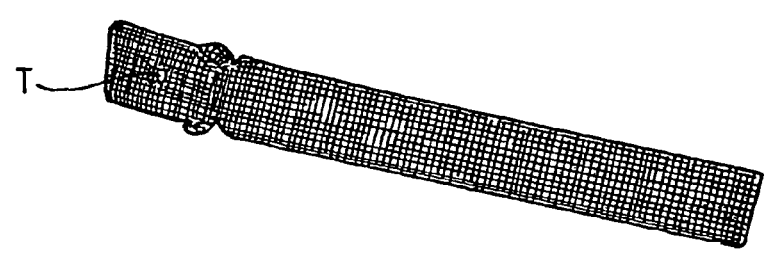
FIG. 20C
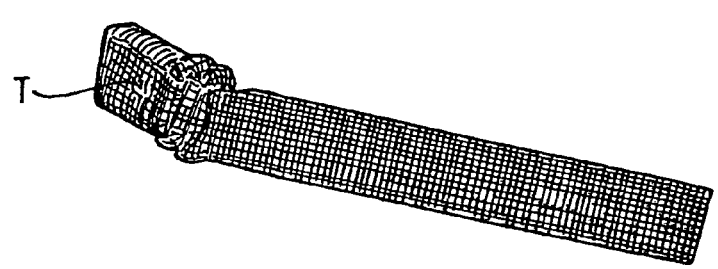
FIG. 20D view XZ
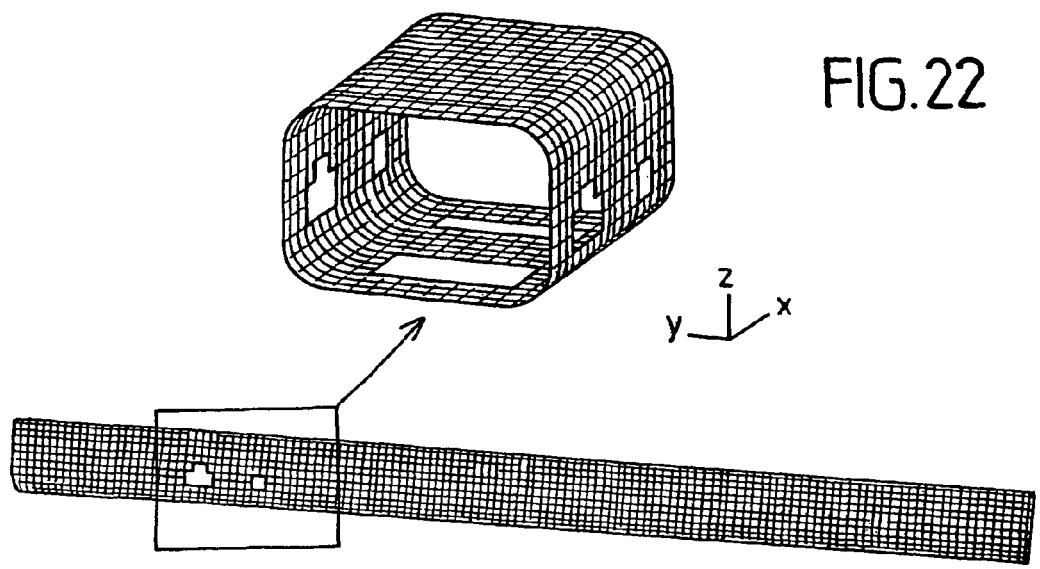
FIG. 22
FIG. 22A
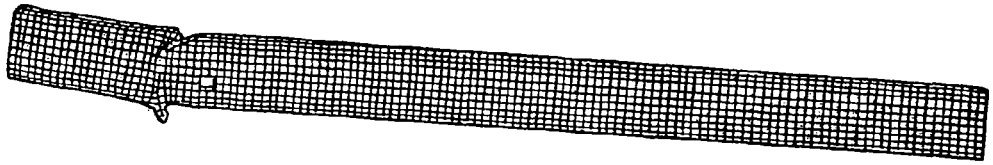
FIG. 22B
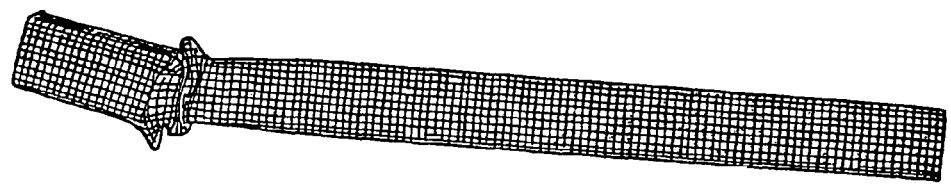
FIG. 22C
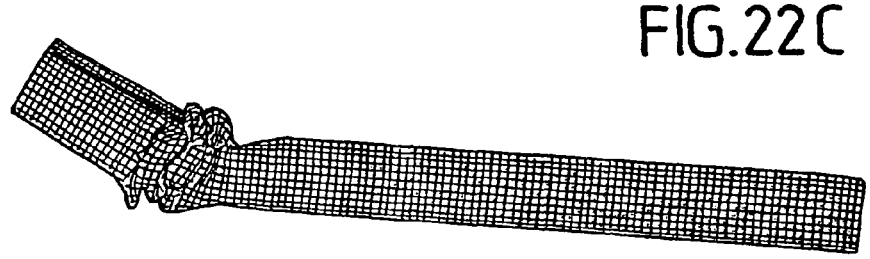
FIG. 22D View XY
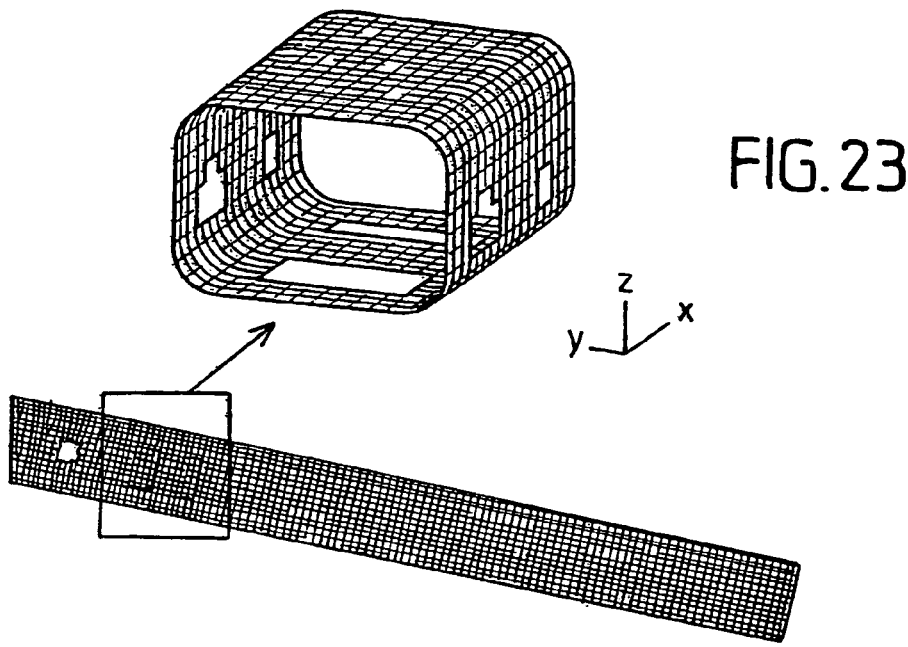
FIG. 23
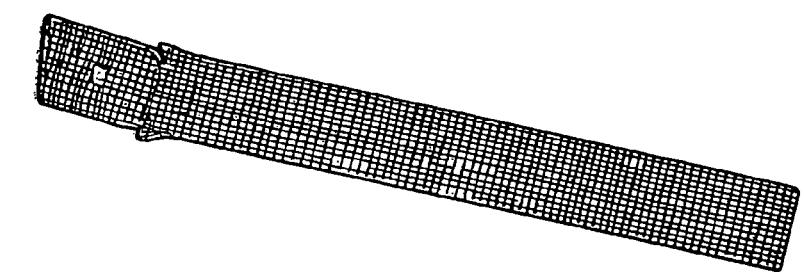
FIG. 23A
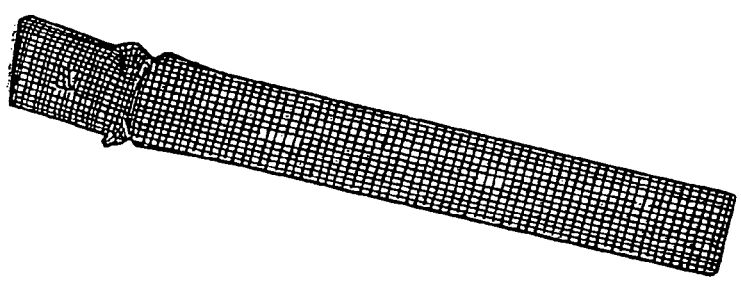
FIG. 23B
FIG. 23C
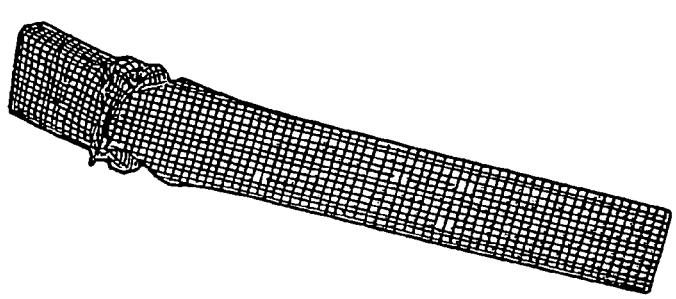
FIG. 23D

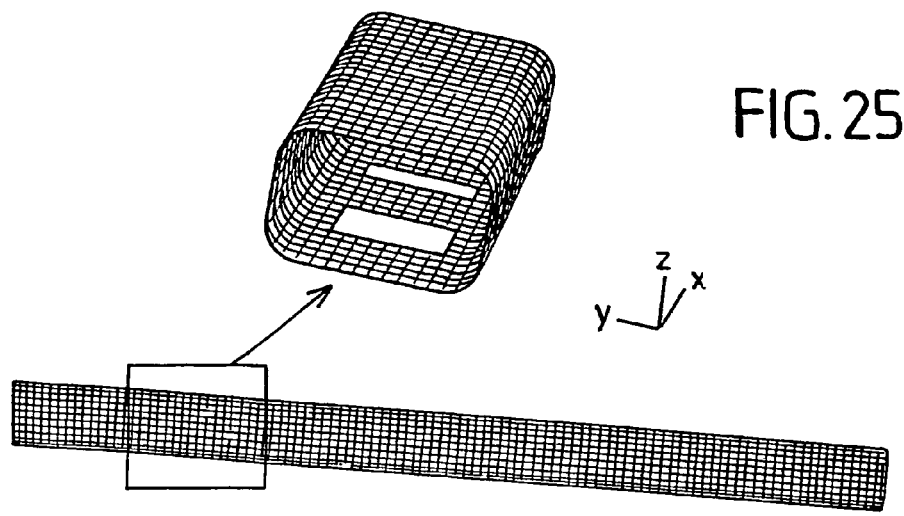
FIG. 25
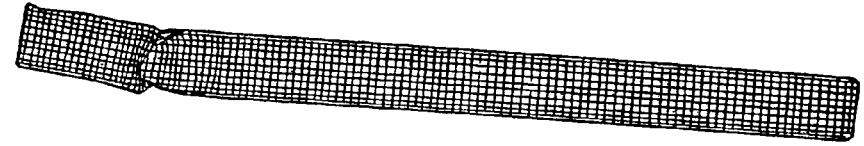
FIG. 25A
FIG. 25B
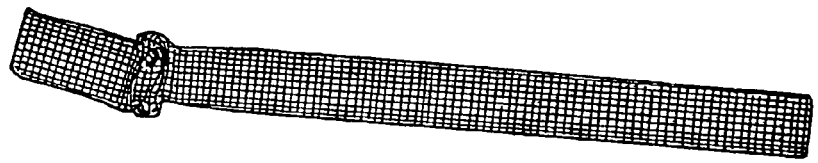
FIG. 25C
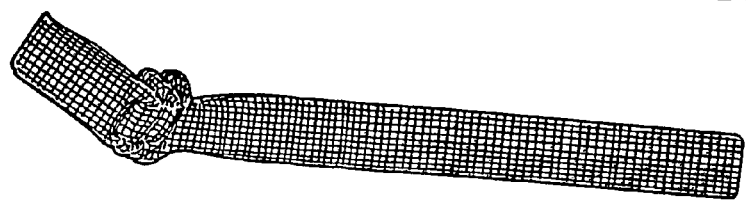
FIG. 25D view XY
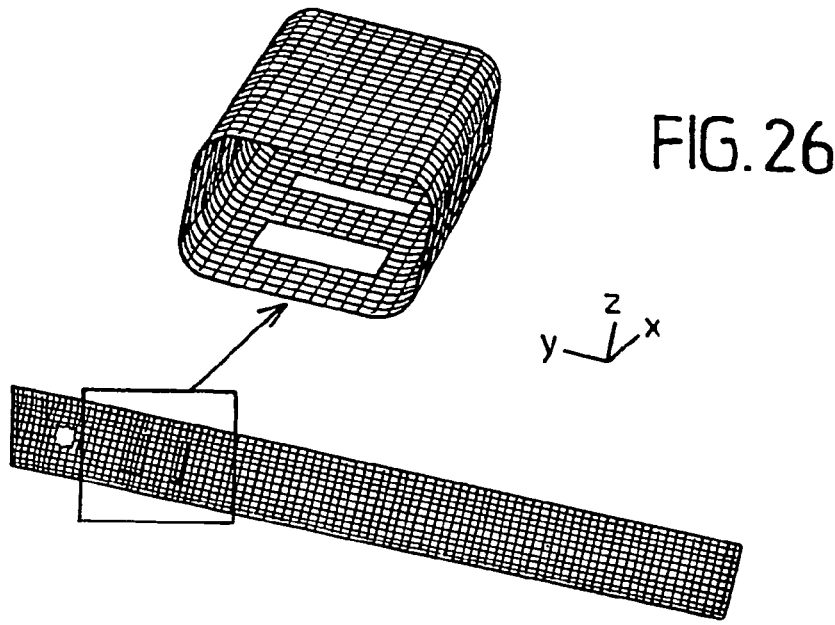
FIG. 26
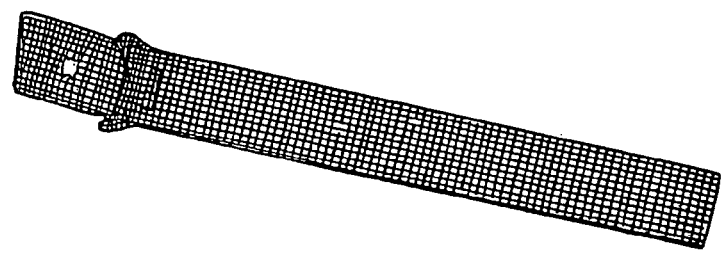
FIG. 26A
FIG. 26B
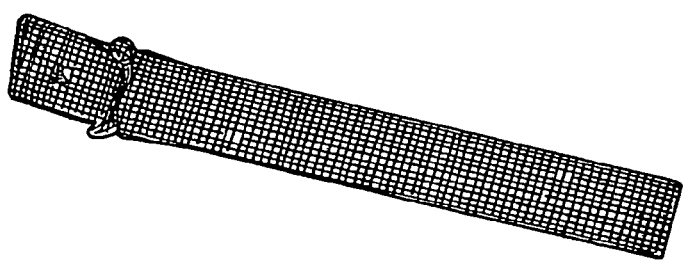
FIG. 26C
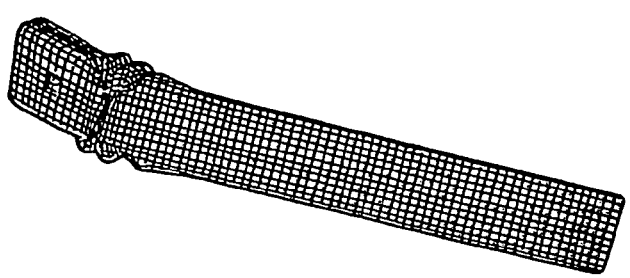
FIG. 26D

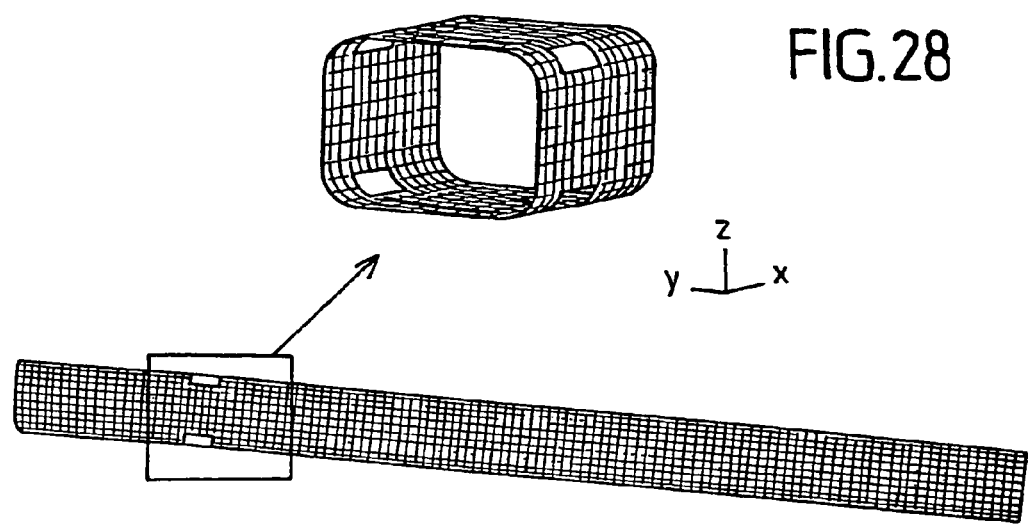
FIG. 28
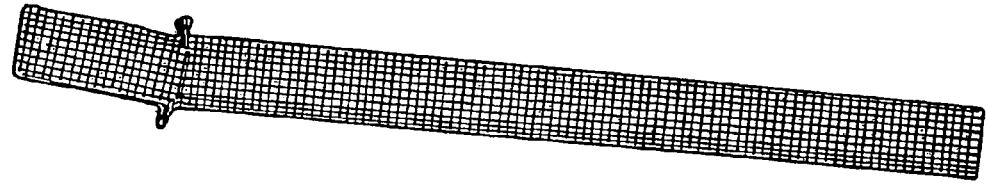
FIG. 28A
FIG. 28B
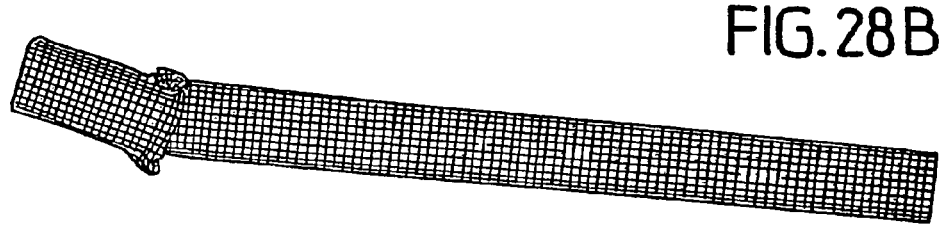
FIG. 28C
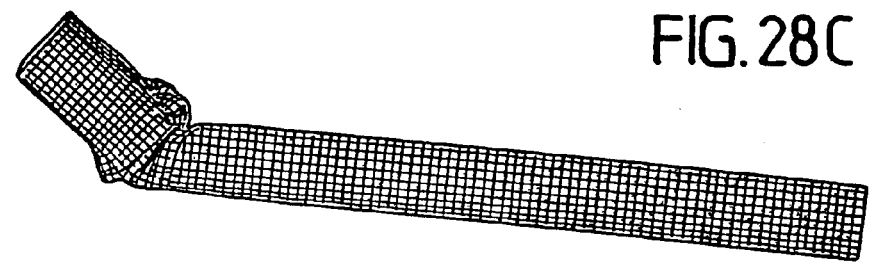
FIG. 28D

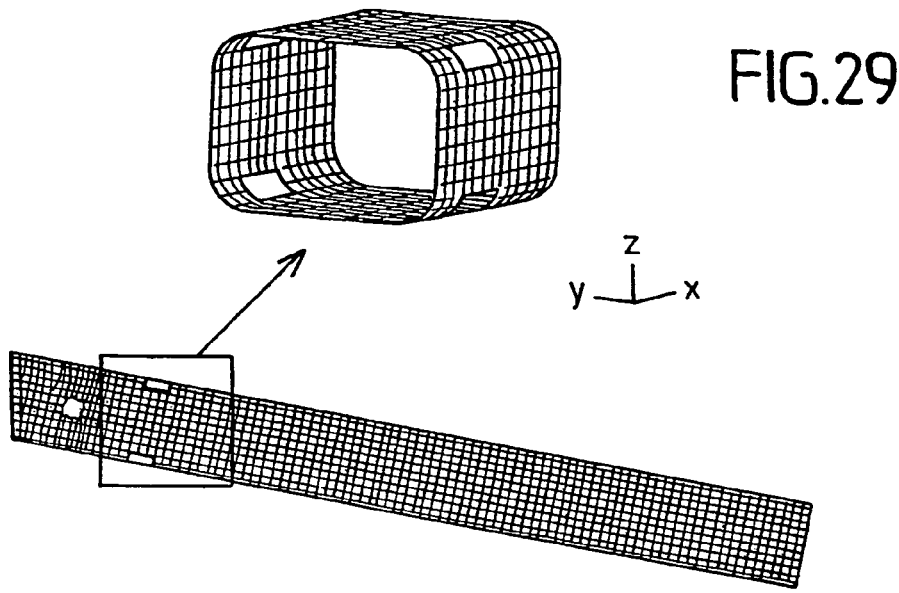
FIG. 29
FIG. 29A
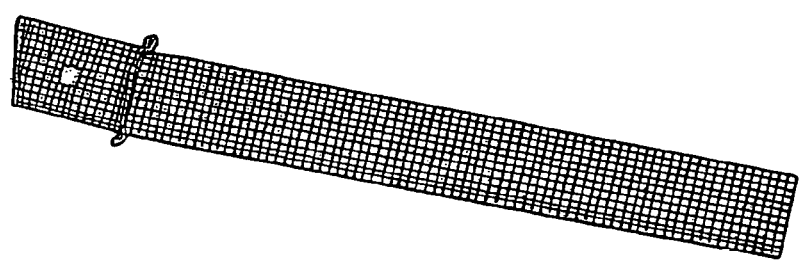
FIG. 29B
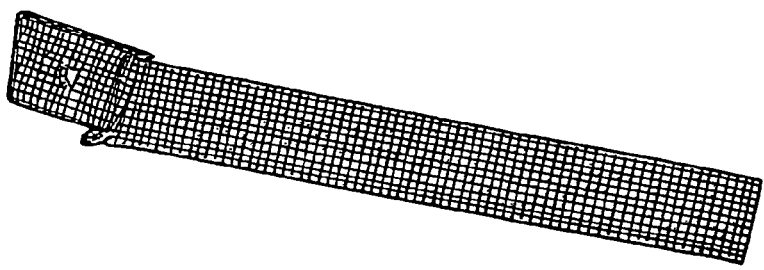
FIG. 29C
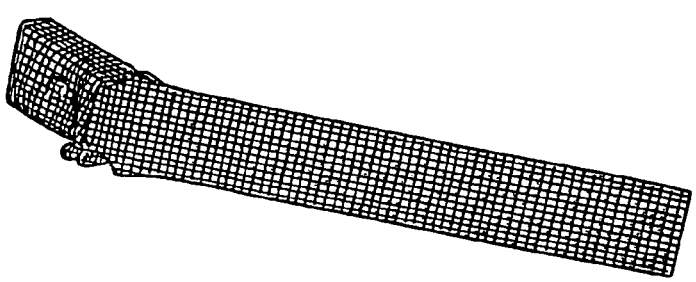
FIG. 29D

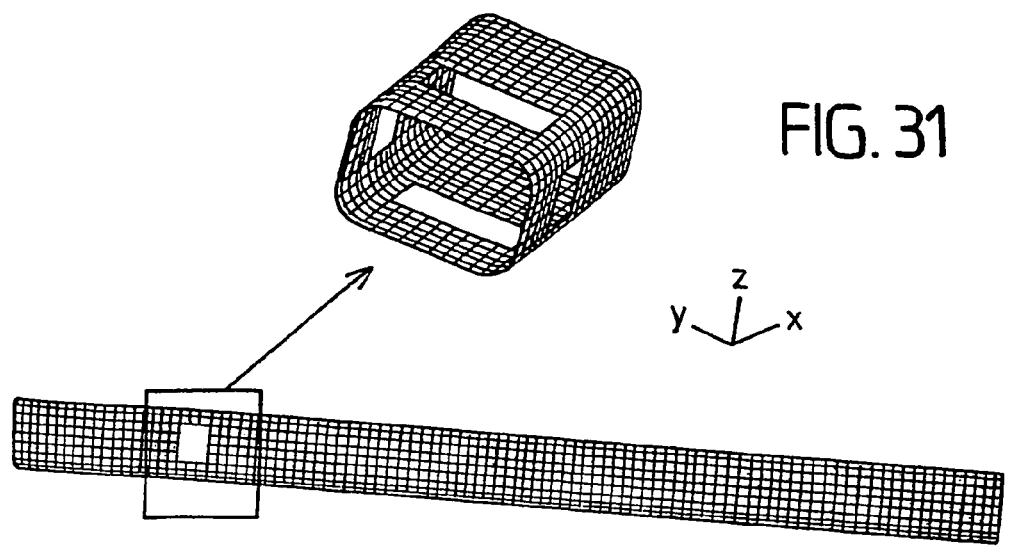
FIG. 31
FIG. 31A
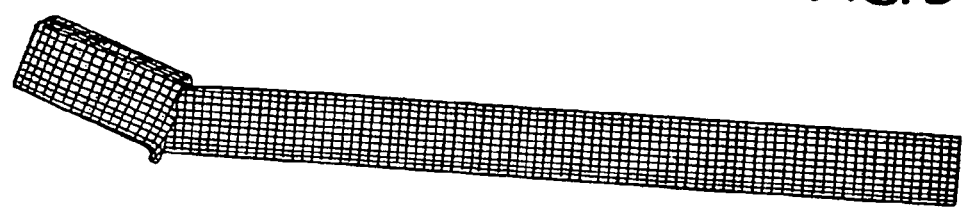
FIG. 31B
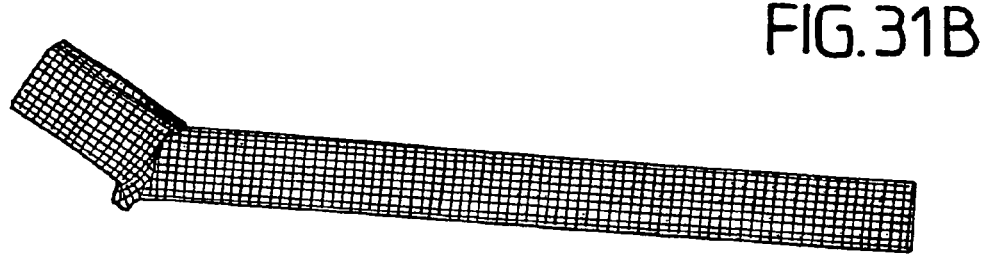
FIG. 31C
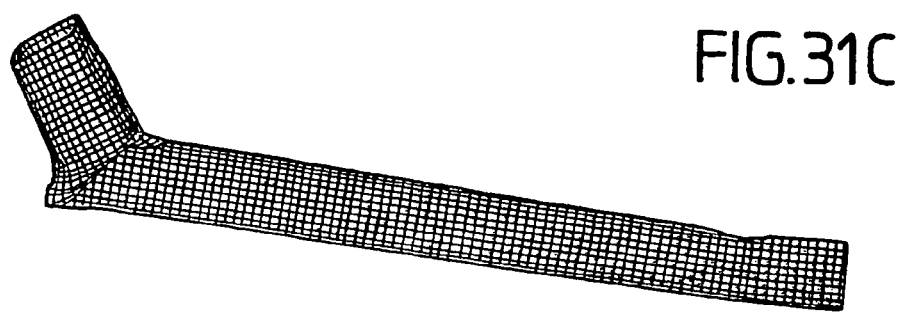
FIG. 31D View XY
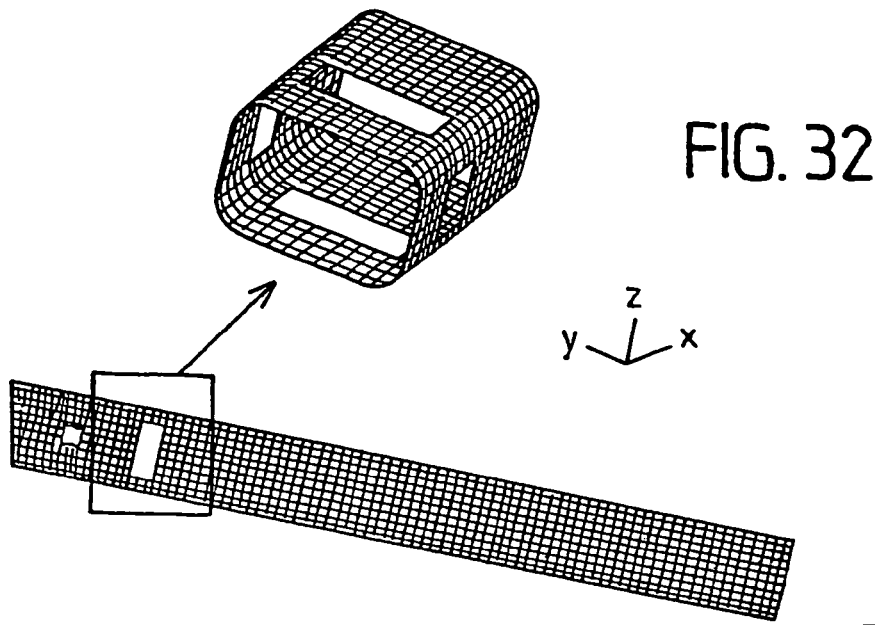
FIG. 32
FIG. 32A
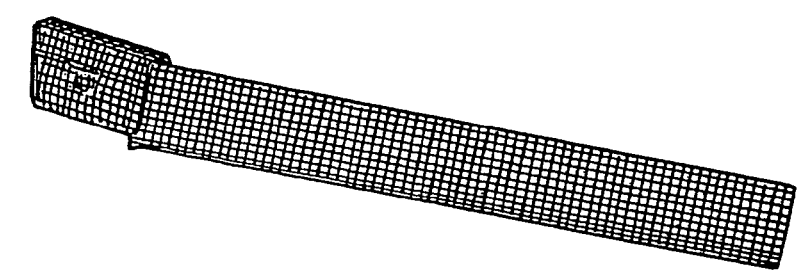
FIG. 32B
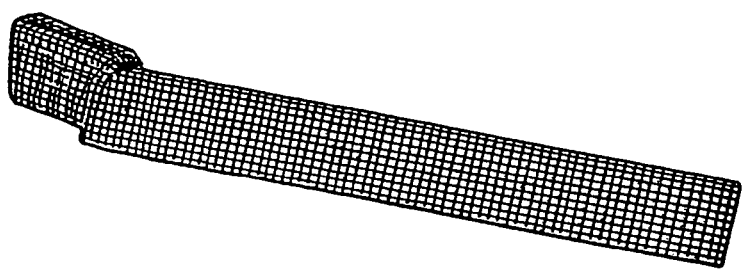
FIG. 32C
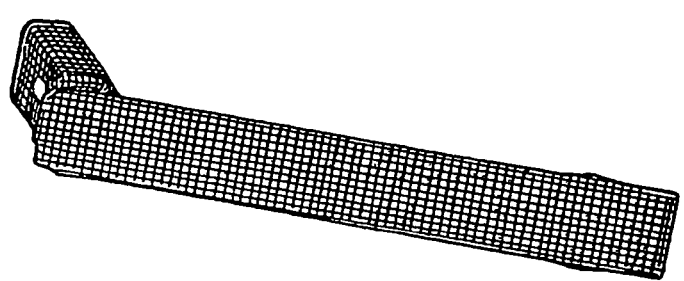
FIG. 32D

VEHICLE STRUCTURAL ELEMENT SERVING TO ABSORB CERTAIN SHOCKS BY PLASTIC DEFORMATION

FIELD OF THE INVENTION

The invention relates in particular to the safety of vehicles, in particular in the case of impacts either with a pedestrian, a cyclist, a motor cyclist, another motor vehicle, a fixed object such as a construction like a wall, a house, or a tree, although these examples do not form a restrictive list of fixed or mobile objects with which a vehicle can collide.

DISCUSSION OF THE BACKGROUND

When there is a collision with a pedestrian, a cyclist or a motor cyclist, the magnitude of the impact is not very great, but there is an absolute need to protect as much as possible the physical integrity and life of the pedestrian or (motor) cyclist.

Then, in order of magnitude, the known examples of incidents range from impacts in an urban environment to extremely violent impacts known as a "crash" by specialists, in which the life of the passengers of the vehicles must be protected and if possible they must be prevented from receiving any injury consequent upon this impact or at least the severity thereof must be minimised.

Over the last few years, car manufacturers have been led to develop various solutions to respond to these safety constraints, but without being able to find entirely satisfactory solutions. In fact, the technological solutions developed for safety respond first and foremost to scenarios involving frontal impacts, i.e. which are produced so that the forces and stresses are exerted along an axis which is the main axis of the vehicle.

Thus various solutions intended to absorb the kinetic energy of the impact have been implemented on parts of the structure of the vehicles such as the side bar, the cradle, and even by adding to the structure of vehicles complementary means such as for example absorbers, cradle side bars, prolongations or extensions.

But hitherto, it has not been possible to find a satisfactory solution in the case of impacts in which the forces and stresses exerted on the structural elements of the vehicle are not directed along the main axis of the vehicle, which in the case of the impact consequently subjects certain structural elements or the abovementioned complementary means to forces which combine simultaneously forces and torques.

Moreover, the solution realized hitherto do not make it possible to control and localize the point(s) of absorption of the kinetic energy entirely satisfactorily, nor to be in a position to absorb widely varying levels of energy according to the impact scenarios, nor to control and select the point(s) of localization of deformation undergone by these structural elements or these complementary means.

SUMMARY OF THE INVENTION

The Applicant has therefore sought to introduce parts which meet these requirements more satisfactorily. The invention represents a considerable advance in this direction.

According to one of its aspects, the object of the invention is a mechanical device comprising an elongate structural element intended to contain at least partially certain impacts by deformation. This element comprises a tube of selected straight section. This tube is equipped with localized alterations of shape and position respectively selected to substantially correspond to a given law of deformation under the combined force of compression along the axis of the part, and of a torque with its axis perpendicular to a plane passing through this axis. The law may comprise a phase of energy absorption followed by elimination of the part.

According to a particular feature of the invention, the cradle or front structure of the vehicle is equipped with one or two frontal elements known as "extensions", in particular with more than two extensions.

Such an extension can be considered as a brace which connects the front of the cradle to the lower bar of the bumper, therefore the base of the bumper, via one or more shock absorbers. The Applicant has observed that the extension must therefore:

- resist a minimum force, below which it remains undeformed, whereas the bumper and the absorber are crushed;
- beyond this minimum force, it must deform, thus absorbing a maximum of energy, without involving damage to the cradle;
- be eliminated at the end of this deformation in order not to provide a brace between the cradle and the obstacle of impact at the end of being crushed.

BRIEF DESCRIPTION OF THE DRAWINGS

Further features and advantages of the invention will appear from the following description and from the attached drawings, which show:

FIGS. 2A and 2B illustrate different possible configurations for a force applied to a part;

FIG. 3 illustrates diagrammatically the notions of bunching and bending;

FIG. 5 shows another example of local alteration of a profile;

FIG. 6 shows, in a grid perspective view, a part having three alterations;

FIGS. 14A and 14B show, in a lateral and in plan view, a part having alterations which are both recessed and protruding;

FIGS. 19 and 20 show in the same way a first part with perforations, in a perspective view, indicating three axes XYZ;

FIGS. 19A to 19D on the one hand and 20A to 20D on the other show different corresponding phases in the deformation of the first part, in side views in the directions XZ and XY respectively;

FIGS. 22 and 23 show in the same way a second part with perforations, in a perspective view, indicating three axes XYZ;

FIGS. 22A to 22D on the one hand and FIGS. 23A to 23D on the other show different corresponding phases in the deformation of the second part, in side views in the directions XZ and XY respectively;

FIGS. 25 and 26 show in the same way a third part with perforations, in a perspective view, indicating three axes, XYZ;

FIGS. 25A to 25D on the one hand and 26A to 26D on the other show different corresponding phases in the deformation of the third part, in side views in the directions XZ and XY respectively;

FIGS. 28 and 29 show in the same way a fourth part with perforations, in a perspective view, indicating three axes XYZ;

FIGS. 28A to 28D on the one hand and 29A to 29D on the other show different corresponding phases in the deformation of the fourth part, in lateral views in the directions XZ and XY respectively;

FIGS. 31 and 32 show in the same way a fifth part with perforations, in a perspective view, indicating three axes XYZ;

FIGS. 31A to 31D on the one hand and 32A to 32D on the other show different corresponding phases in the deformation of the fifth part, in side views in the directions XZ and XY respectively.

The drawings and appendices to the description contain elements of a definite character. They may therefore serve not only to aid understanding of the description, but also contribute to the definition of the invention if necessary.

DETAILED DESCRIPTION OF THE PREFERRED EMBODIMENTS

It is well known to make models of the behavior of mechanical structures in the field of resilient deformation. However, it is a different matter for plastic deformation, all the more so in the case of severe crushing. At this stage, software programs known as "crash calculators" are known, such as RADIOSS, PAM CRASH and LS DYNA sold respectively by the companies MECALOG, ESI Group and LSTC (Livermore Software Technology Corporation). In these software programs, laws of behavior of structures are used which are very different from the laws of resilient behavior. In order to determine these laws of behavior, a dynamic characterization of the material must be carried out in the form in which it is used, together with modeling of the structure. The characterization of the material is effected by experimental means using laws such as those of Johnson-Cook or that of Cowper Symonds. Digital modeling of the structure is affected by using mathematical laws of behavior in the case of large-scale and high-speed deformations.

Figure 1:
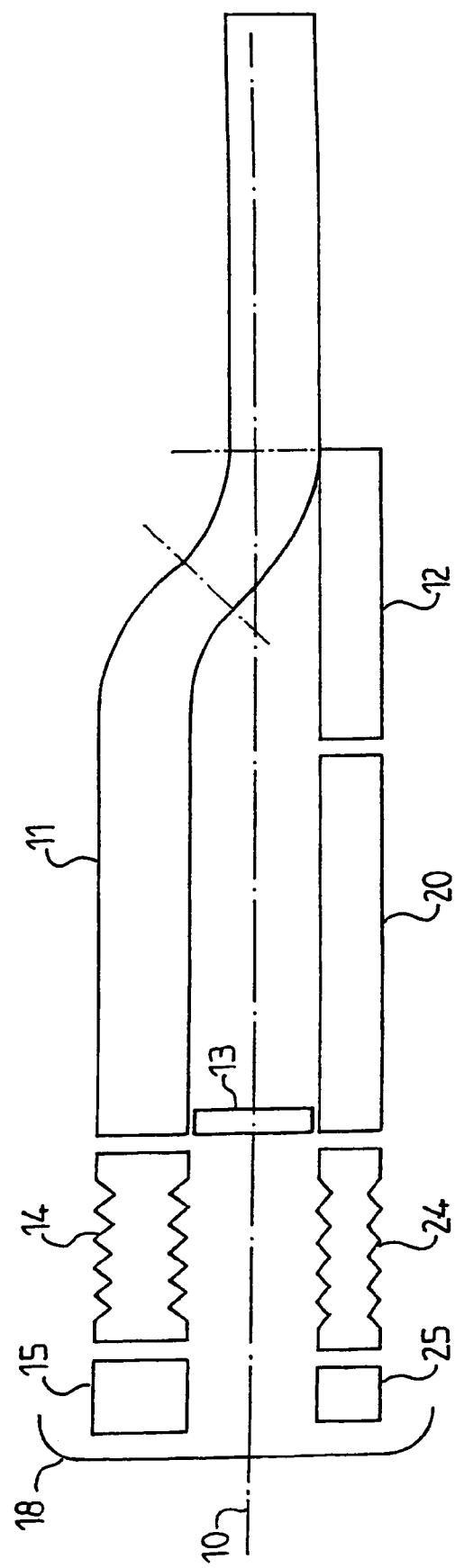
FIG. 1 is a diagram of an embodiment of the front part of a vehicle, left-hand side.

In FIG. 1, which shows diagrammatically an embodiment of the front part (left-hand side) of a vehicle, viewed from the left. This shows a high path and a low path, defined substantially by the axis line 10 (NB this high path is sometimes known as the median path, the high path then being located higher in the vehicle). The front of the vehicle is to the left of the Figure. To the right, on the part of the body, level with the axis line 10, a part 11 known as the side bar is shown, which rises to define the high path, ending with a shock absorber 14 and an upper bumper bar referenced 15.

At the bottom, a cradle 12 is mounted on the side bar 11 in a flexible or rigid manner. This cradle 12 is continued by a part 20 known as the extension, followed by a lower absorber (for pedestrians) 24, then by a lower bumper bar referenced 25. Between the bars 15 and 25 is defined a front bumper 18. Preferably, a hanging part 13 vertically connects the extension 20 and the part of the side bar 11 which overhangs this extension. It should be noted that the extension 20 is suspended on the side bar 11 by means of the hanging part 13. Here, this suspension is not a rigid link.

Structures similar to FIG. 1 can be found for example in FR-A-2 800 695 or FR-A-2 824 523.

The abovementioned software programs may be used in particular in order to seek to give the body structure of a car the desired properties, which for the front of the vehicle are, in general, by an increasing magnitude of impacts:

no deformation to very minor impacts;

then, deformation of replaceable parts such as the bumper and absorbers, without damage to the rest;

then, start of deformation of the whole of the front part, preserving the engine compartment as well as the cradle and the front axle;

finally, major deformation with destruction of the whole of the front part, the concern being to preserve the passenger cell, whatever the consequences for the vehicle.

Until now, efforts have been limited to working on the parts which are not very likely to buckle, since:

they are not very slender (in the sense of Euler), or they are well supported at various places along their length, such as the front side bars (supported by the various bracing functions of the components which are connected thereto: wheel housings, gearbox support, for example), or the rear side bars (supported by the wheel housings, the rear chassis, the crossbar for example).

The Applicant has taken a different approach, by concentrating on structural elements such as the extensions mounted at the end of a short cradle, instead of the long cradle most frequently used.

In this case, such structural elements are not generally supported over their length, which is considerable. They are therefore capable of being subjected to buckling. The formula [I] of the appendix 1 gives a definition of the slenderness $\lambda$ in the sense of Euler, where:

L is the length of the element,

S is the area of its straight section, and

Imin is the minimum modulus of inertia in the section being considered.

To return to the prior art, the existing mechanical parts having similar functions are for example shock absorbers. These parts are produced in the form of closed, hollow bodies composed of sheet metal, having "bunching corrugations". These are peripheral deformations in a straight section (the "corrugations"), or angular breaks, or similar means capable of enabling the part to fold in on itself like a plastics bottle (bunching).

These known parts are rather short (in the main direction of movement, therefore of impact) relative to their straight section. Thus buckling is avoided, because these parts are not very slender.

The Applicant has therefore first of all considered the problem of how to realize similar functions, but with rather long parts, in particular to act as extensions, as defined above. Typically, the elements proposed have a slenderness higher than 25, in particular considerably higher than 25. The slenderness may make it possible to define approximately a minimum length. If need be, a maximum length can be defined from the formula [II], where E is Young's modulus, F is the critical Euler force, and k is a coefficient taking the value k=1 when the part is freely rotatable at each of its ends. A person skilled in the art knows the other values that k takes in other cases.

It first of all seemed possible to keep without buckling a rather high force of axial thrust (Fmin). Hollow profiles of low thickness, with rounded corners, have been advantageously used. "Low thickness" is taken to mean the range of thicknesses compatible with the desired resistance to buckling as well as with an aptitude to bunch before buckling. It has also been found possible to control bunching, by suitably defining the profile of the straight section, still without buckling.

The profile may have the general form of a straight cylindrical surface. Although its straight section may cover numerous different polygonal shapes, these will most frequently be square or rectangular. However, the invention is also applicable with a part having one or more cambers over its length.

According to the prior art cited above, the bunching elements are composed of sheet metal in the form of U-shaped profiles welded together to form a closed profile.

According to the invention, advantageously a tube of the welded or weld-free type is used, having the following properties;

no welding between two half-profiles, therefore no discontinuity in the welding as is generally the case with sheet metal.

no covering, therefore less material and cost, while achieving at least the same degree of strength.

In the second place, the Applicant has sought to obtain, with the same part, first of all longitudinal deformation ("bunching"), then deformation with bending along a transverse axis ("bending").

Furthermore, the Applicant has also sought a part which can have these properties both when the force applied is one of pure compression, and when it is accompanied by a torque. The torque may be due:

to the fact that the part is oblique relative to the main direction of movement of the vehicle (FIG. 2A), and/or to the fact that an oblique impact is taking place, i.e. a frontal impact having a lateral component, in itself or due to the fact that it is not aligned with the axis of the part (FIG. 2B).

In the present description, the word "torque" refers both to the moment vector of a torque (FIG. 6A) and to the algebraic measure of the torque, i.e. the amplitude of the vector.

FIG. 3 shows very diagrammatically the desired behavior as a function of increasing forces, from left to right.

Figure 4C:
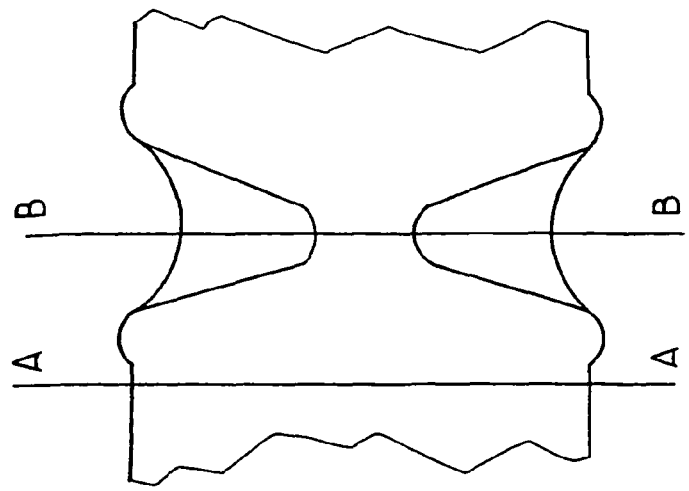
FIGS. 4B and 4C shows a first example of a local alteration of this profile, in this case by deformation.
Figure 4B:
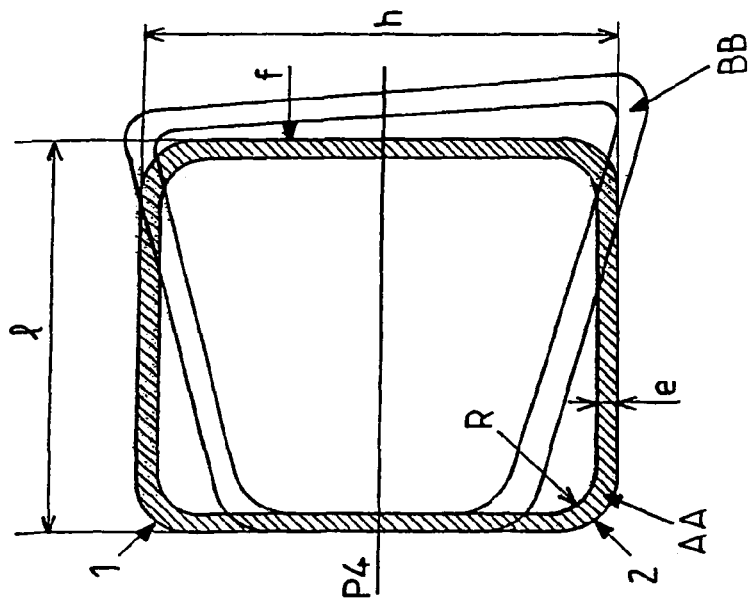
Figure 4A:
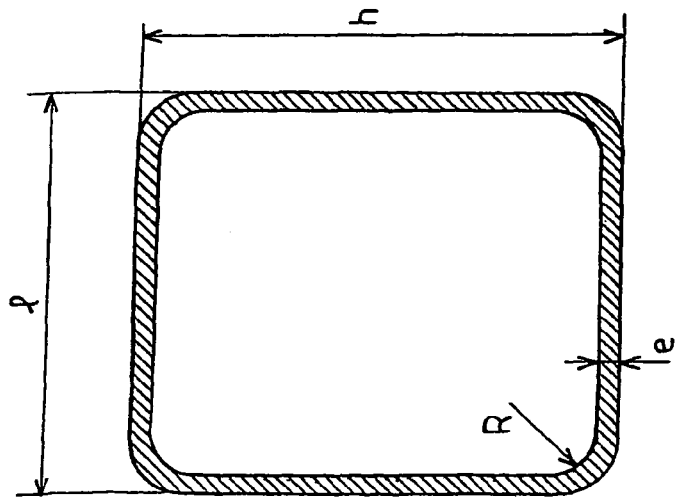
FIG. 4A shows an example profile, viewed in section, with references.

FIG. 4A shows a profiled part of substantially uniform straight rectangular section. FIG. 4B shows the same part, having local alterations in cross-section, whereas FIG. 4C is a view from the left of the part in FIG. 4B.

In this example, the local alteration takes the form of a deformation, in this case by indentation, of each of the contiguous angles (1) and (2) of the section, while leaving the opposite face (f) to deform freely. During this operation, the perimeter of the section is substantially retained.

The alteration of FIGS. 4B and 4C is almost symmetrical relative to a median longitudinal plane P4 of the part.

In principle, the recessed alterations (indentations) are on a small face, and the protruding alterations (bumps) are on a large face.

Compared to FIG. 4, FIG. 5 has an alteration of the same principle, but distinctly asymmetrical with respect to the median longitudinal plane P5 of the part.

In this example, the local alteration is present in the form of an indentation of the angle (1) and of the face (f1), which is in this case the upper face, while leaving the adjacent face (f2) to deform freely. As in the case above, the perimeter of the section is substantially retained.

FIG. 6 shows in perspective a part thus equipped with three alterations A1 to A3 according to FIG. 5.

In practice, the alterations can be carried out by conventional shaping (e.g. by embossing) or by hydro-forming, or by means of other similar techniques of shaping.

Figure 6A:
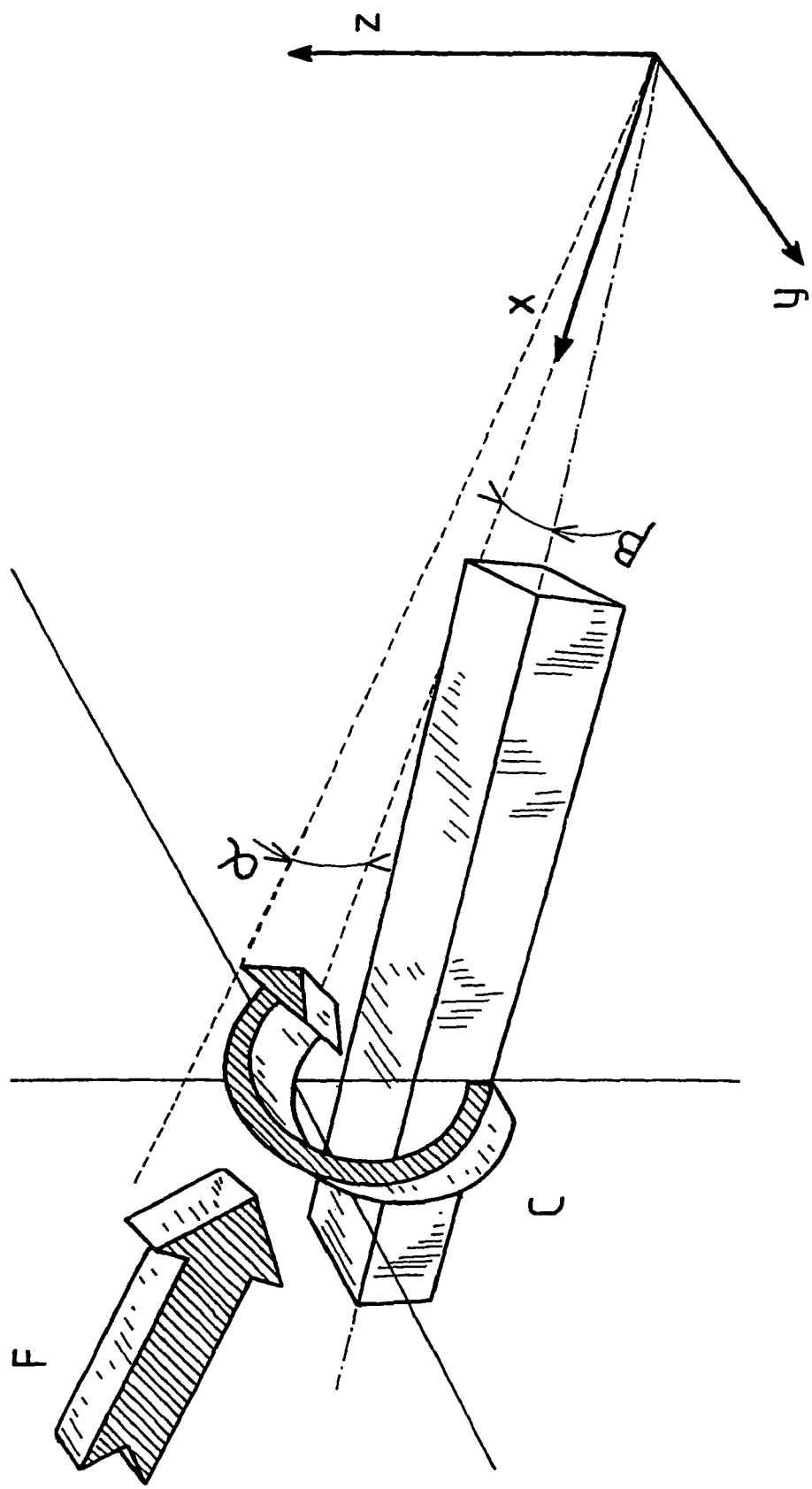
FIG. 6A shows, in a perspective view, various references relating to a part.

FIG. 6A gives parameters of position and stress of a part e.g. according to FIG. 6, the front of the vehicle being to the left of the Figure.

Figure 7:
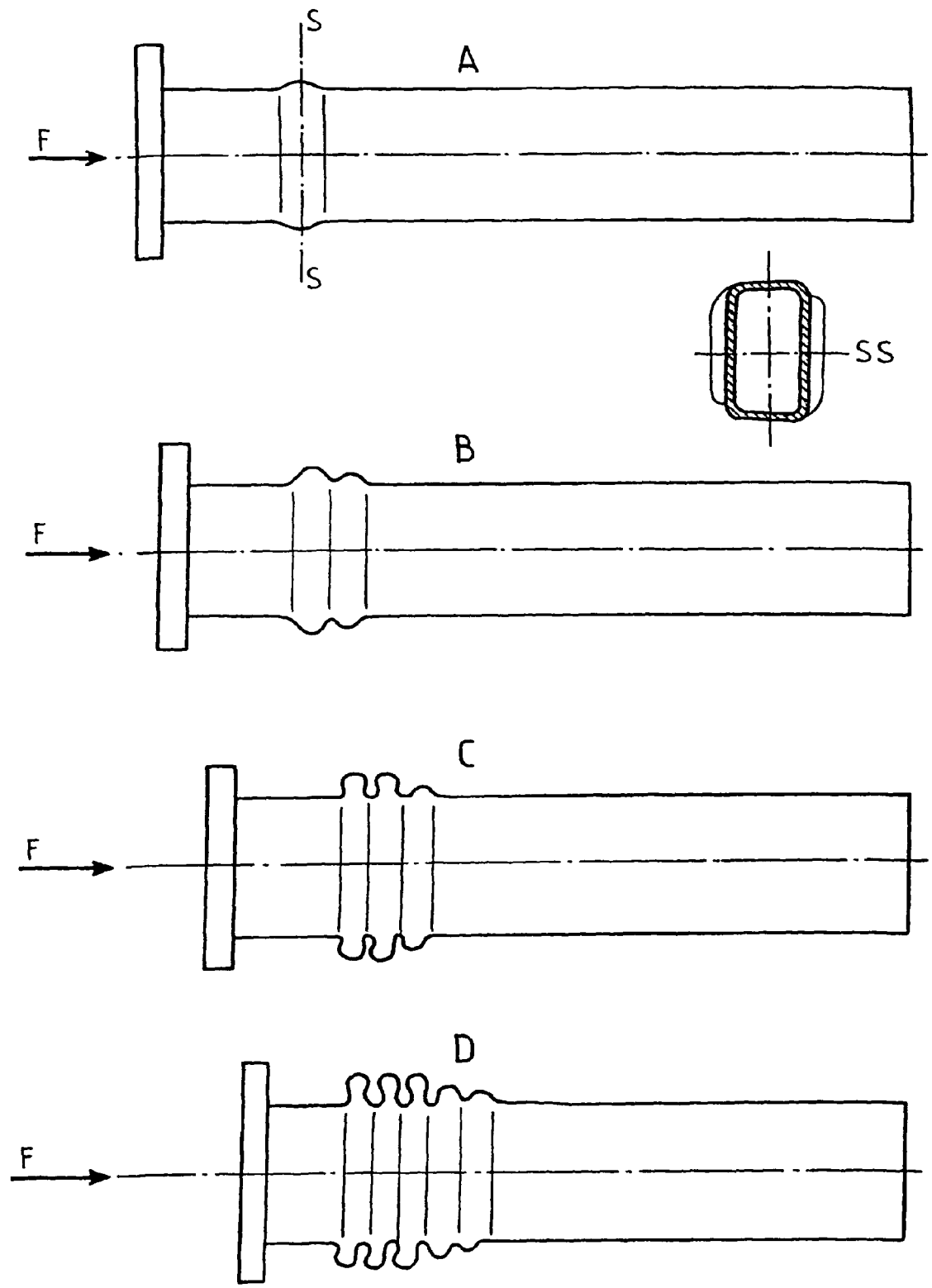
FIGS. 7A to 7D show, in a side view, different phases in the deformation of a part, here by bunching under a substantially pure axial force.

FIGS. 7A-D show the different stages (or sequences) of the deformation of an extension formed in a hollow body, here a square tube, equipped on two of its opposite faces with symmetrical bulges formed perpendicular to the longitudinal axis and affecting the whole width of the faces concerned (protruding folds or protruding alterations) and on the two other opposite faces symmetrical indentations also formed perpendicular to the longitudinal axis and affecting the whole width of the faces concerned (recessed folds or recessed alterations). These alterations of the part act as trigger points for deformation when the part is subjected to a force exerted along its axis. FIG. 7A shows the extension at rest.

As deformation (crushing along the longitudinal axis of the part) develops:

FIG. 7B: the first fold whose formation was generated by alteration of the head;

FIG. 7C: this is followed by the formation of a second, a third, an nth and a last fold;

Finally, FIG. 7D, complete crushing of the part can be seen along its longitudinal axis (the folds form one after another like a wave which spreads from the first alteration);

This phenomenon is known in the art as "bunching".

Figure 8A:
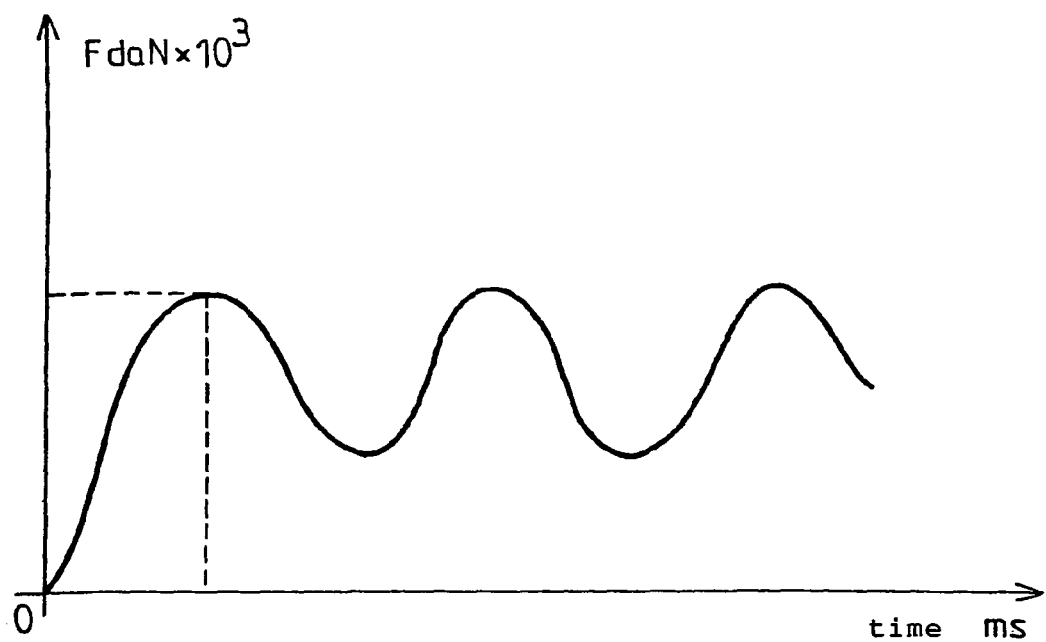
FIGS. 8A and 8B show graphs which show, but for the part from FIGS. 9A to 9D, distinguishing deformations between the upper face and the lower face.
Figure 8B:
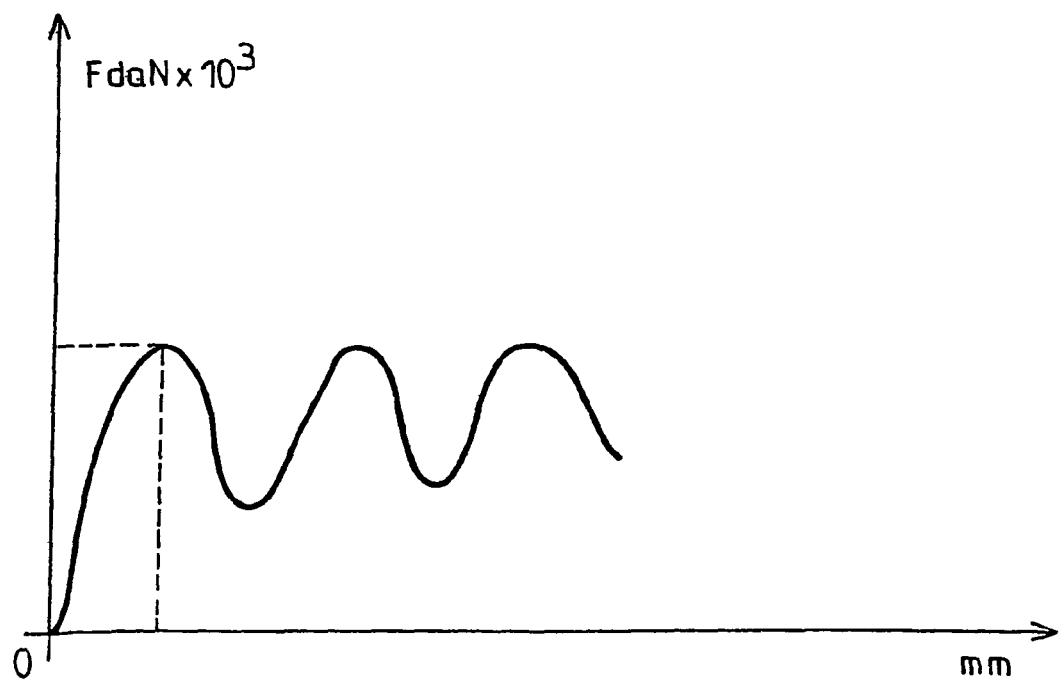

FIGS. 8A and 8B are respectively a graph which shows the development of the force curve (y axis) according to time (x axis) for a part subjected to a pure axial force according to FIGS. 7A-D, and a graph showing this same phenomenon with the degree of crushing (or decrease in length) as the x axis of the part upon impact. The forces in the part are the same on the upper and lower faces.

FIGS. 9A-D show a part identical to that of FIG. 7A, but show the case where this part is subjected to forces which combine a force exerted along the longitudinal axis of the part and a torque exerted along an axis perpendicular to the longitudinal axis of the part and in a main plane of symmetry of the part (here having an axis perpendicular to the plane of the Figure). Taking the case of a misaligned force F, this gives rise to a force A along the longitudinal axis and a torque C.

Figure 9:
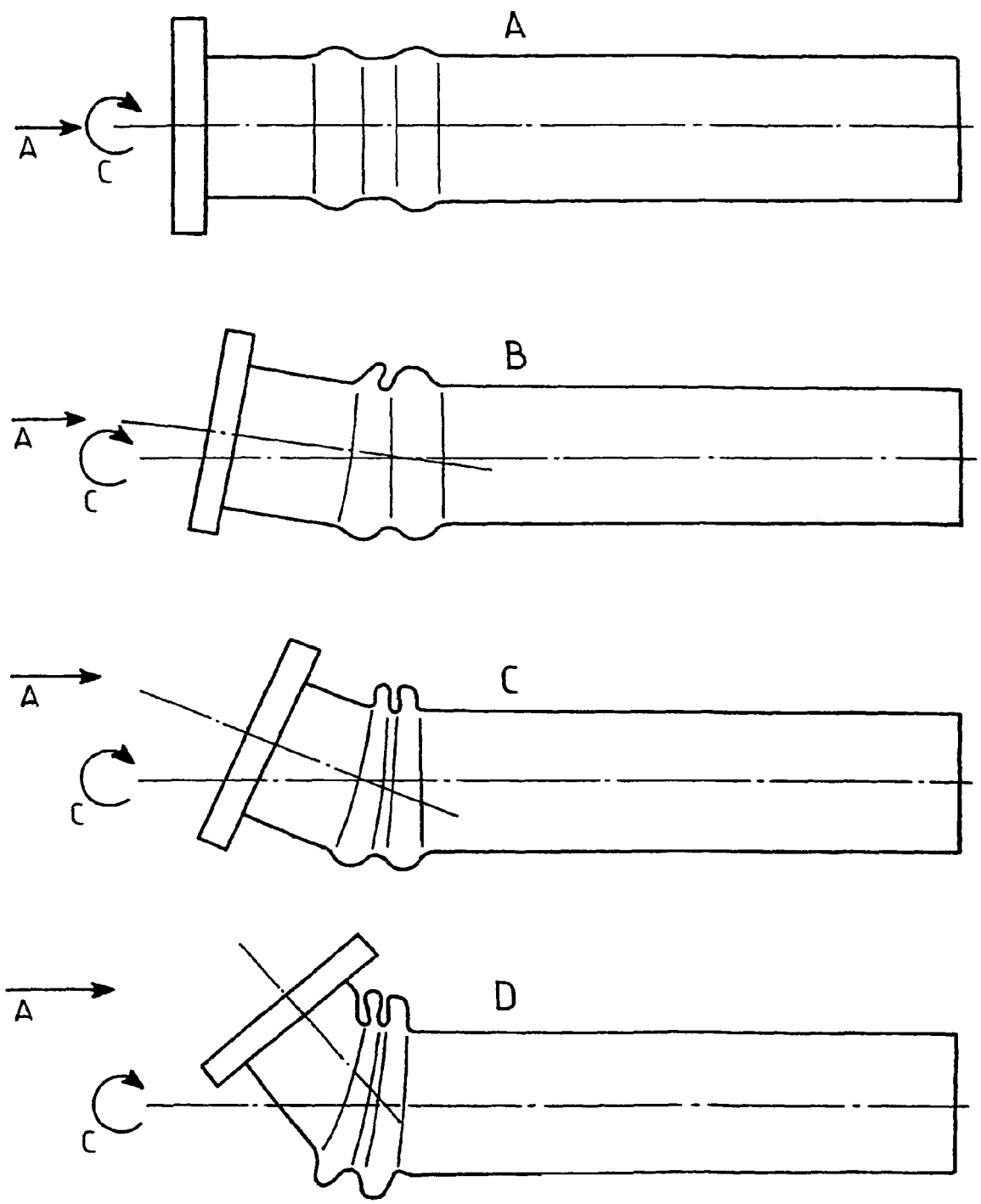
FIGS. 9A to 9D show, in a side view, different phases in the deformation of a part, here by bending under an axial force accompanied by a torque.

As can be established, the part in this case undergoes immediately an angular deformation (breakage of its longitudinal axis—a phenomenon which is known in the art as "bending"), which results in insufficient absorption of the kinetic energy (contrary to the illustration in FIG. 7A-D) and uncontrolled deformation (bending). Force F is increased; force A and torque C increase jointly and proportionally. At first the part resists (FIG. 9A); then it changes immediately to progressive bending (FIGS. 9B to 9D).

Figure 10A:
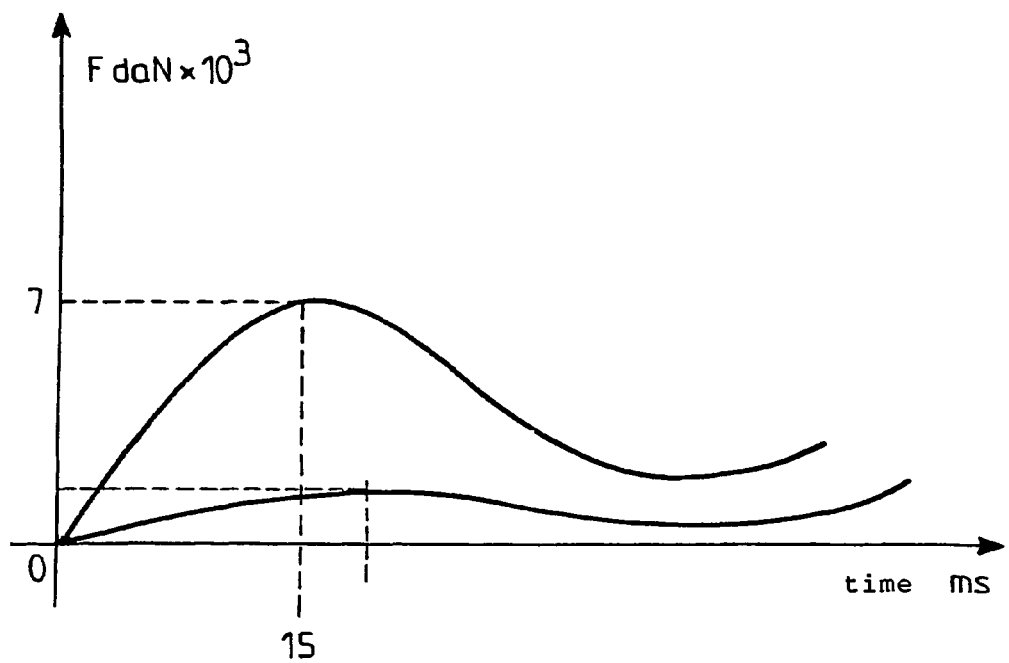
FIGS. 10A and 10B are respectively graphs of the same type as those of FIGS. 8A and 8B, but for the part from FIGS. 9A to 9D, distinguishing between the upper face and the lower face.
Figure 10B:
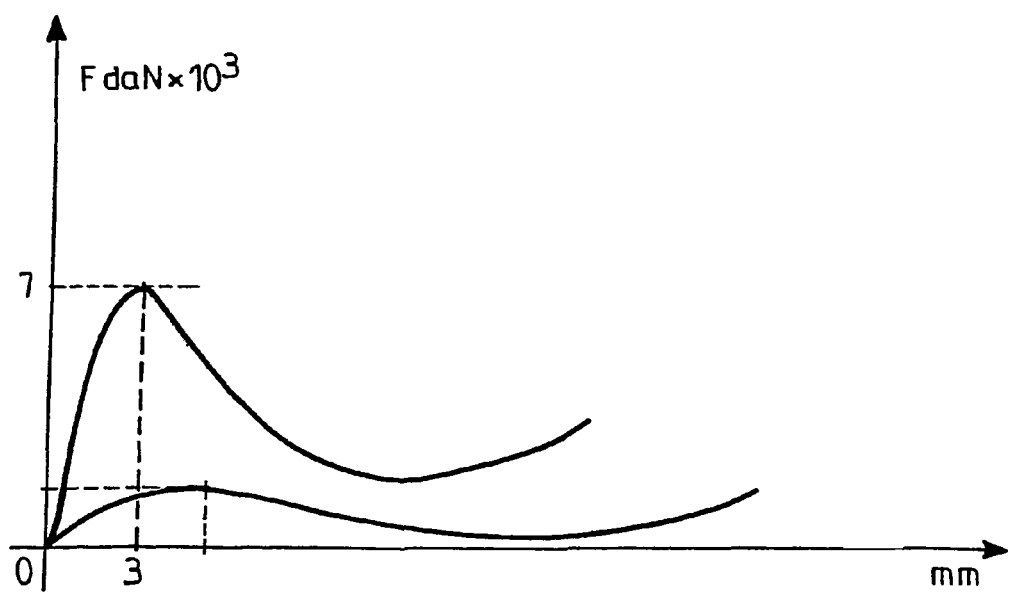

FIGS. 10A and 10B are respectively a graph showing the development of the force curve (y axis) according to time (x axis) for a part subjected simultaneously to a force and a torque according to FIGS. 9A-D, and a graph showing the same phenomenon with as the x axis the degree of crushing (or decrease in length) of the part upon impact.

Here, FIG. 10A shows the laws of force according to time in the part, where:
upper curve: maximum force (upper face) and
lower curve: least force (lower face).

Bending starts in a zone adjacent to the first peak of force. It is accompanied by closing of the fold of alteration on the upper face. It may be considered that bending is due to the fact that the force peaks in the two opposing faces of the part are neither of the same value nor simultaneous.

FIG. 10B shows the laws of force as a function of the crushing in a part, where:
upper curve: maximum force (upper face) and
lower curve: least force (lower face).

The overall behavior only stems from the resilient field at the start of the region located before the first peak. Beyond the first peak, FIG. 10B shows the force conditions in the part during bending, according to its deformation.

FIGS. 11A to 11E relate to an example of a part formed according to the invention.

This part is equipped on at least one of its faces with alterations which do not affect the whole of the face concerned (in straight section). Such arrangements of the parts are referred to here as "non-symmetrical alterations" or "asymmetrical alterations". This notion also includes the case where according to another embodiment, the alterations are oriented, i.e. form an angle which is non-perpendicular to the longitudinal axis of the part.

More generally, it is desired to have a plane of asymmetry of the alteration(s), this plane passing through the axis of the part. One may consider that:
the alterations are asymmetrical relative to the axis of the part, in a plane which passes through the axis of the part and is perpendicular to the axis of the torque vector (this is the plane of the drawing in FIG. 11A),
or else that the alteration(s) is/are asymmetrical relative to a plane passing through the axis of the part and through the axis of the torque vector (this is the plane passing through the axis and perpendicular to the plane of the drawing in FIG. 11A).

For such a part, subjected as in the cases of FIGS. 9A-D to a force A and to a torque C, it is found that the deformation is initiated by the formation of a fold from the first alteration, followed by the formation of other folds (bunching) then a bend. In such a case, there is therefore a first phase of resistance to deformation, then under the effect of the increase of intensity of the force and of the torque, the phenomenon of bunching (with absorption of kinetic energy) occurs, followed by a phenomenon of "bending". As will be seen below, the starting point of this bending can be controlled as well as the direction of corresponding folding. This makes it possible to destroy the mechanical elements according to a scenario of deformation in order to preserve the passenger cell (or to limit its damage) and thus to contribute to preserving the physical integrity of the passengers in the vehicle in the case of an impact.

FIGS. 11A to 11E relate to a case of a part having asymmetrical alterations of the type defined in FIG. 5.

This part is subjected to a thrust F which, as seen above, is translated into a force A along the longitudinal axis and a torque C having an axis perpendicular to the plane of the drawing. F, and therefore force A and torque C are increased proportionally. It is thus possible to obtain the following behavior:
at first the part is resistant (FIG. 11A);
then, unlike FIGS. 10A-B, bunching starts (FIG. 11B), the part withdrawing into itself (it folds symmetrically at the periphery);
bunching takes place (FIG. 11C), then bumps into the second alteration (FIG. 11D);
later the part starts to bend (FIG. 11E), with asymmetrical folding.

In the above examples, the asymmetrical alterations remain substantially contained within a region perpendicular to the axis of the part. It is possible to effect oblique ("oriented") alterations with a selected gradient (FIGS. 13A-E).

Figure 11:
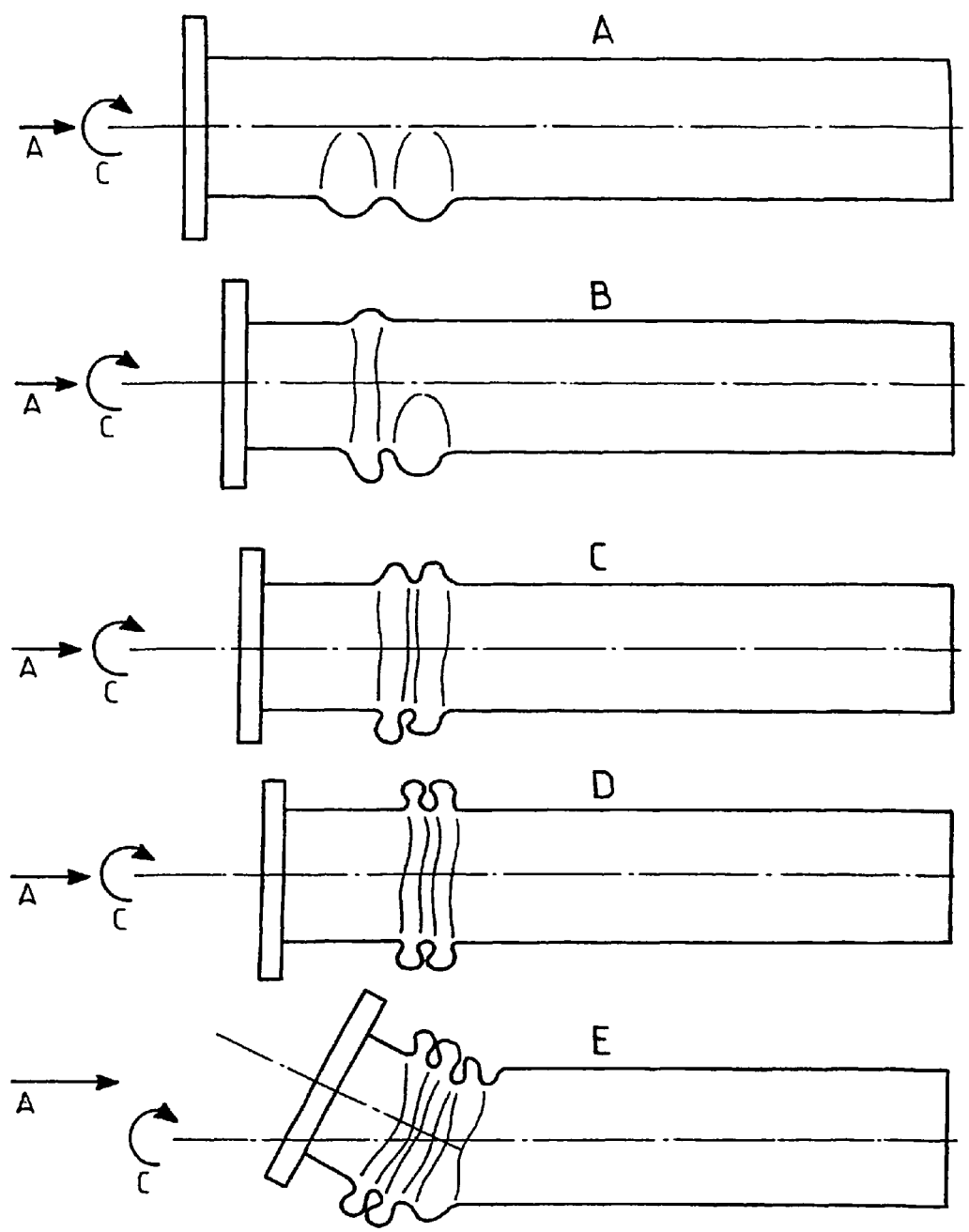
FIGS. 11A to 11E show, in a side view, different phases in the deformation of a part, here by bunching, then bending under an axial force accompanied by a torque.
Figure 12A:
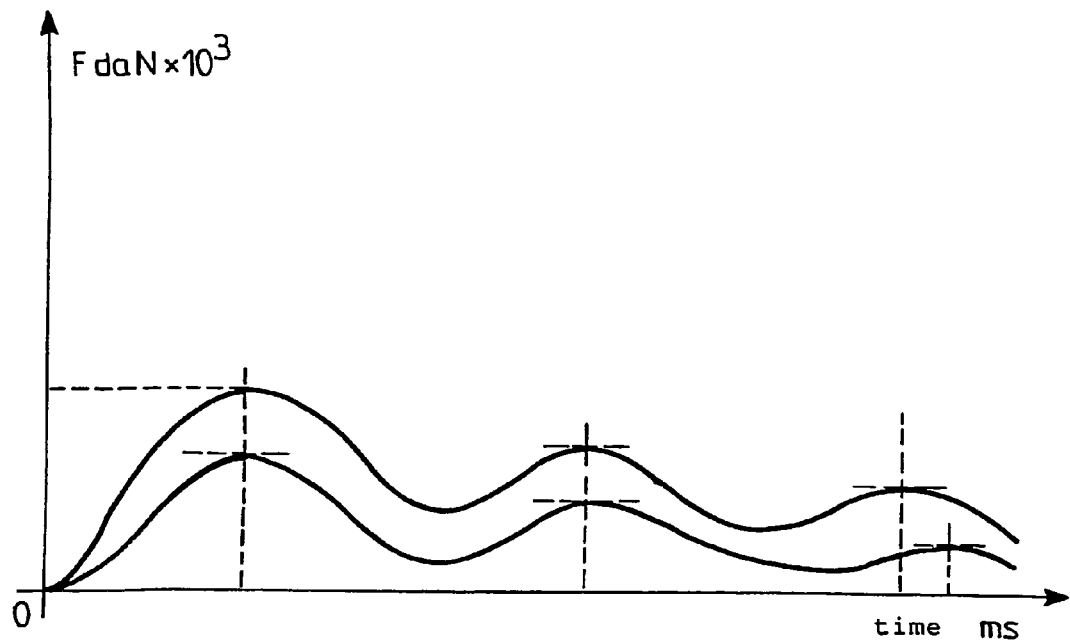
FIGS. 12A and 12B are respectively graphs of the same type as those of FIGS. 10A and 10B, but for the part in FIGS. 11A to 11D.
Figure 12B:
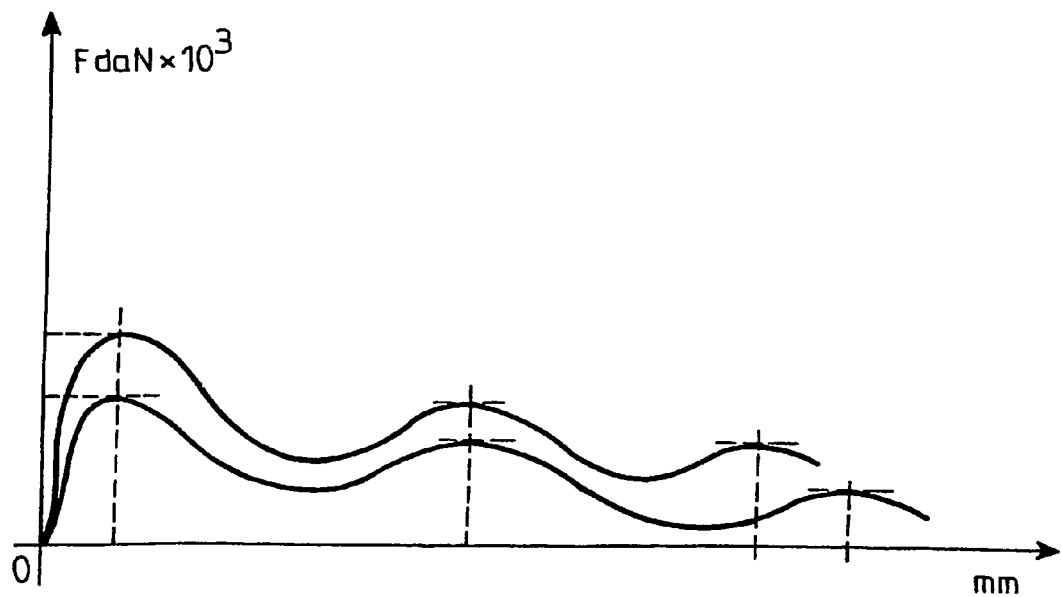
Figure 13:
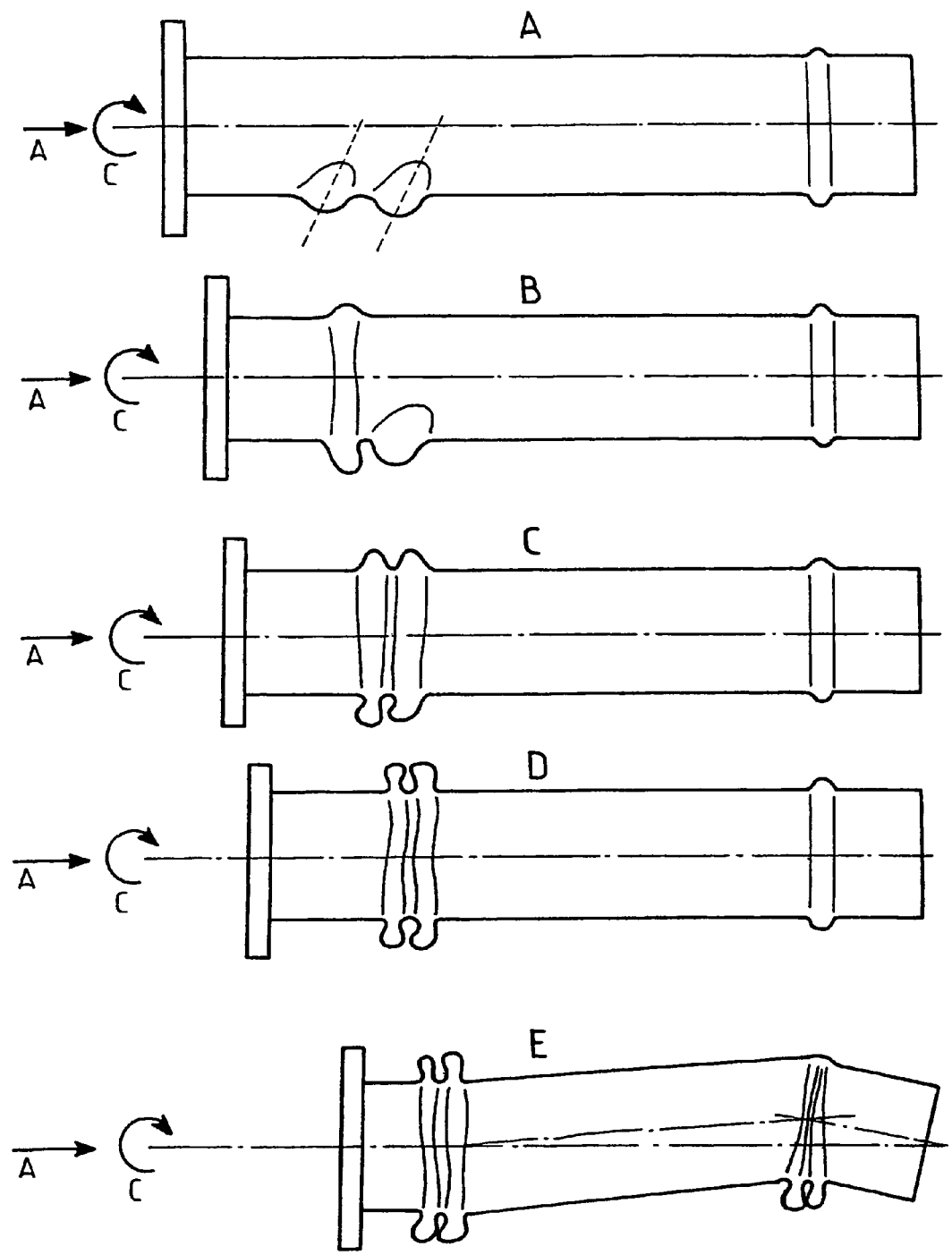
FIGS. 13A to 13E show a part equipped with alterations slightly differing in position.

The curves of FIGS. 12A and 12B are the counterparts of those in FIGS. 10A and 10B, but for the part in FIGS. 11A-E.

FIGS. 12A and 12B show that bunching remains in so far as it is possible to keep substantially simultaneous the peaks of force on the upper and lower faces. This is true in FIG. 12A for the first two peaks, which correspond to the two alterations consecutively. It is only afterwards that bending starts, the part bending asymmetrically, in principle elsewhere than at the alterations, as FIG. 11E shows.

FIGS. 12A and 12B comprise the two charts showing the curves of force over time and time over degree of crushing for the parts according to FIG. 11.

FIGS. 13A-E show a part having on the one hand the asymmetrical alterations having the function of starting bunching, and on the other hand one or more complementary alterations, which may have a different form from those above, and have the function of starting bending. Moreover, at least some of the alterations are oriented.

The behavior of the part according to FIGS. 13A-E can be described by curves of the same type as those of FIGS. 12A and 12B.

The number of zones of alternations capable of generating bunching can be one, two or three or more.

As far as the selected point of bending is concerned, it is possible to restrict this to one single alteration zone or to have a plurality of such zones, in particular if a plurality of points of being are desired.

One type of asymmetrical alteration may be both recessed and protruding, as FIGS. 14A and 14B show, which are two views of the same part along two perpendicular axial planes. The straight sections of the two alterations are shown at S1 and S2. In FIG. 14A, the alterations have recessed folds, whereas in FIG. 14B, the alterations have protruding folds. The two planes of the views can in this case represent two respective components of the torque.

Fundamentally, the alterations are deformed zones. To these can be added apertures or perforations, in a selected manner, which reinforce the effect of the alterations. As a modification, the alterations can be realized solely by apertures or perforations, as will be seen below.

In other words, one or more alterations may advantageously be opening out, i.e. its apex (protruding alteration) or base (recessed alteration) comprises an aperture (e.g. a hole or bore), whose shape and contours will be selected, e.g. according to the force stresses to which the crash scenario leads.

Figure 15:
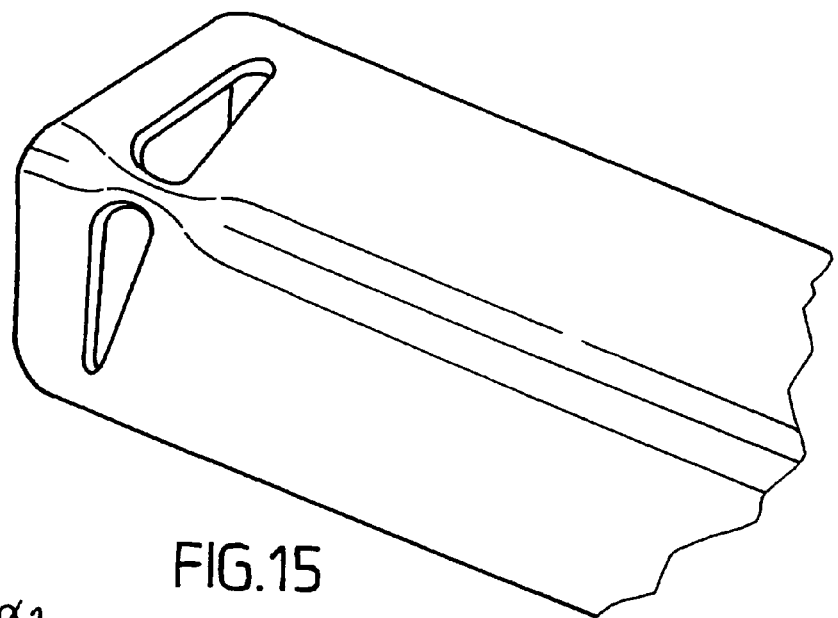
FIG. 15 shows a part having alterations of a slightly different type, comprising a deformation and a perforation.

An example of an opening-out recessed alteration is shown in FIG. 15. It should be noted that the zone of the edge comprised between the two apertures is also given a recessed shape.

The part can thus be at least partially equipped internally with a lining, e.g. of a non-compressible foam. A selective filling may help to define the bunching and/or bending points.

Figure 16:
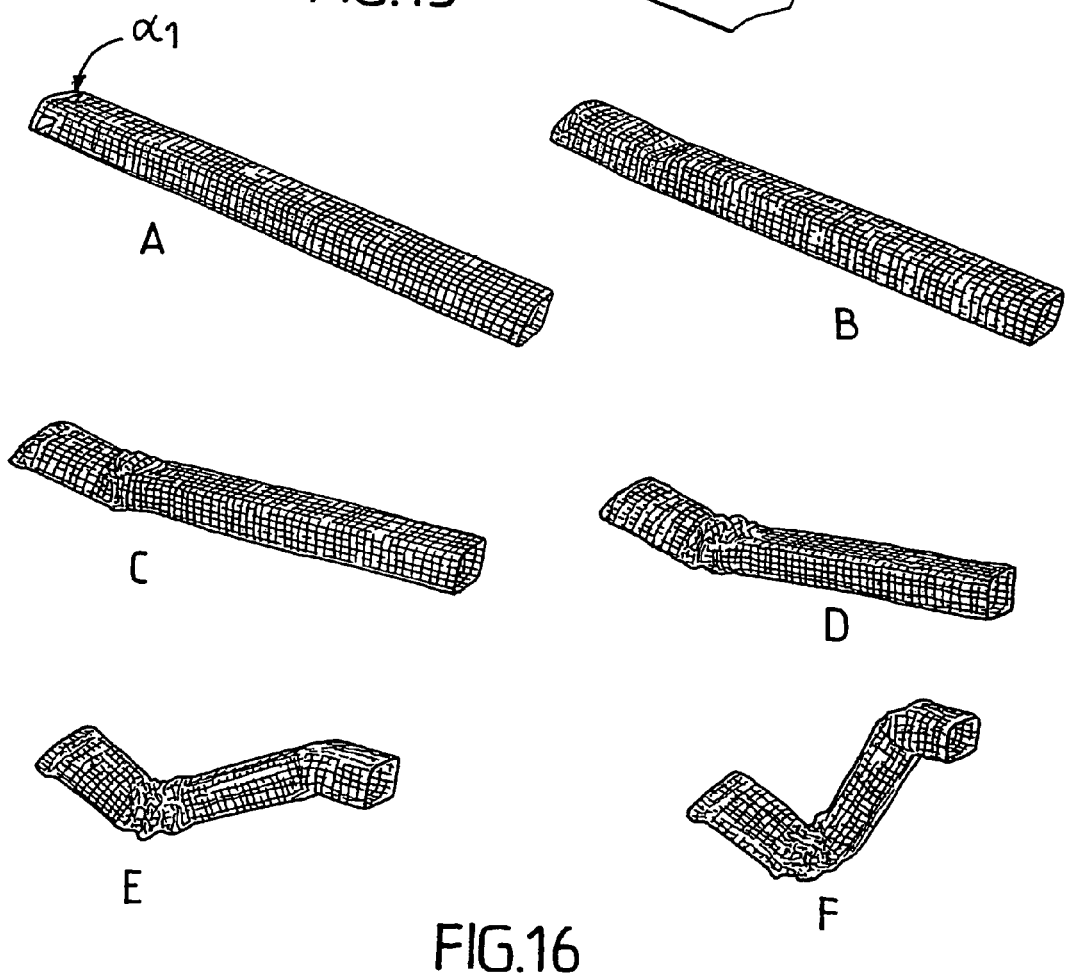
FIGS. 16A to 16F show, in perspective, different phases in the deformation of a part, here by bunching then bending, under an axial force accompanied by a torque.

FIGS. 16A-F, 17A-F and 18A-F show various states of a part during deformation, respectively in perspective, in plan, and from the side. The various phases of the Figures correspond substantially to one another. The part has alterations $\alpha 1$, $\alpha 2$, $\alpha 3$ and $\alpha 4$. FIG. 16A shows that the alteration $1\alpha$ has two apertures similar to those of FIG. 15. The alterations $\alpha 2$, $\alpha 3$ and $\alpha 4$, here of the recessed asymmetrical type, are easily visible in FIG. 18A.

Figure 17:
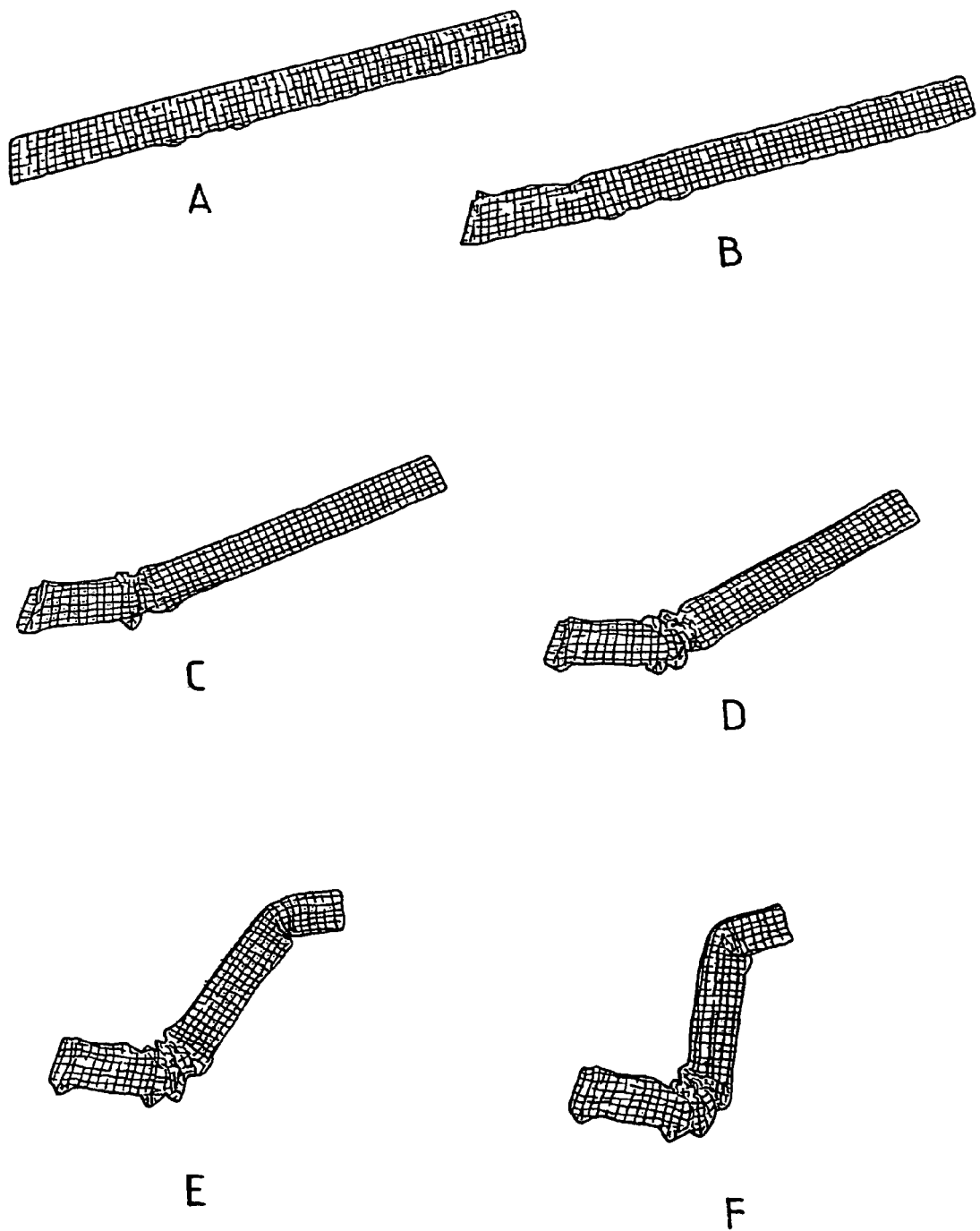
FIGS. 17A to 17F correspond to FIGS. 16A to 16F, but in a plan view.
Figure 18:
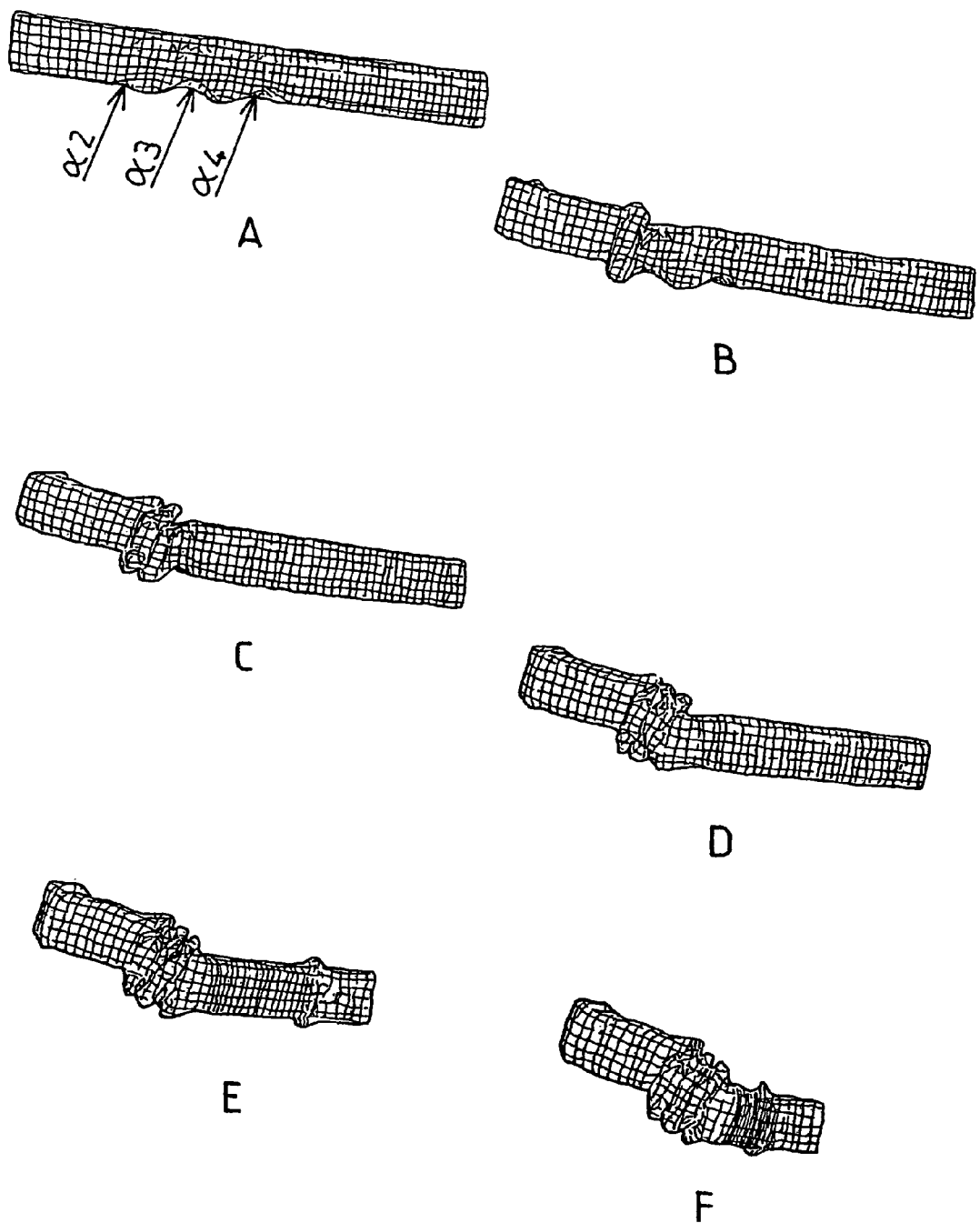
FIGS. 18A to 18F correspond to FIGS. 16A to 16F, but in a side view.

FIGS. 16A, 17A and 18A show the part at rest. In the example, it is intended that the part is substantially free at its left-hand end (front of the vehicle) and fixed at its right-hand end (cradle side). This is a hollow metal profile whose dimensions are, with the references of FIG. 4A [minimum indicative forks for this example are given in square brackets]:

l=50 mm [30 to 60]

h=70 mm [40 to 90]

e=2 mm [1 to 4]

R=5 mm [2 to 30].

FIGS. 16B, 17B and 18B show the start of bunching. This is accompanied by limited indentation of the left-hand end of the part, which places this in the desired position in order that the force applied is translated into bunching, here combined with very slight bending (left-hand end zone).

In FIGS. 16C, 17C and 18C followed by 16D, 17D and 18D, bunching previously started is continued, whereas the slight bending previously started remains substantially unchanged. Until then, it is therefore bunching which clearly predominates. This makes it possible to absorb a very significant quantity of energy.

In FIGS. 16E, 17E and 18E followed by 16F, 17F and 18F, the double folding of the part can be seen, or the double bending thereof: firstly, the continuation of bending already sketched in on the left, and secondly another bending point on the right, here connected to the fact that the part is fixed at this side (cradle).

This important phase makes it possible to obtain the desired elimination, of which it has been seen that it is absolutely essential in car safety.

An important aspect of the invention is that such elimination is preceded by a phase of considerable energy absorption, as has been seen.

If we return to FIG. 1, the invention makes it possible for an extension of given length to obtain the desired law of energy absorption, followed by elimination. Although this aims substantially at the lower path of the front of the vehicle, it is not impossible to apply the part proposed to other front elements, or to other impacts, e.g. lateral or rear impacts, or even to applications other than cars.

In the current state of its research the Applicant has observed that a front part having symmetrical alterations (in the vicinity of a straight section) resisting without deformation up to a threshold force Fmin is capable, beyond this force Fmin, of energy absorption by bunching in the case of a pure axial force, but on the other hand, will bend automatically in the presence of a non-negligible torque component. On the other hand, in this case, it has been found possible by a suitable choice of alterations which are at least in part asymmetrical, to obtain first absorption of energy by bunching, if necessary by controlling draft bending, whereas significant bending only occurs later. Such a part has very advantageous properties, which it is possible to provide, therefore to select, according to different industrial needs. The choice can be made by trial and error.

The Applicant has also sought to obtain the desired effects by using only apertures or perforations ("holes"). This will now be described on the basis of 5 groups of Figures formed in the same manner, and corresponding to 5 parts having different arrangements of perforations. The first three parts considered have holes placed asymmetrically (in the vicinity of a straight section); the two last parts have on the other hand holes placed symmetrically in the vicinity of a straight section.

FIGS. 19A-D shows, in perspective view, the case of an alterations of the tube of FIG. 19 by two pairs of perforations placed on the lower edges or "corners" of the tube. FIG. 20 repeats FIG. 19 in order to aid understanding.

A test has been drawn up to correspond substantially to the conditions of the test known as "EURO NCAP" (European crash test) at an initial speed of 64 km/h, reproducing the assembly conditions of the part on a vehicle but without its complete environment.

Consequently the part is subject to a joint force of compression and torque. The effect of the torque is that the upper part of the tube (top of the figures) is more strongly stressed.

The lateral views of FIGS. 19A and 20A are taken at a moment close to the start of deformation. Then, FIGS. 19B to 19D, as well as 20B to 20D are taken at further instants at intervals of 2.5, 5 and 10 milliseconds respectively.

In all the Figures in a side view XY, at point T can be seen the mark of a fixing bore that the part comprises. This bore is not an alteration proper, although it may also play such a part.

It is found that this tube bunches, then bends.

Figure 21A:
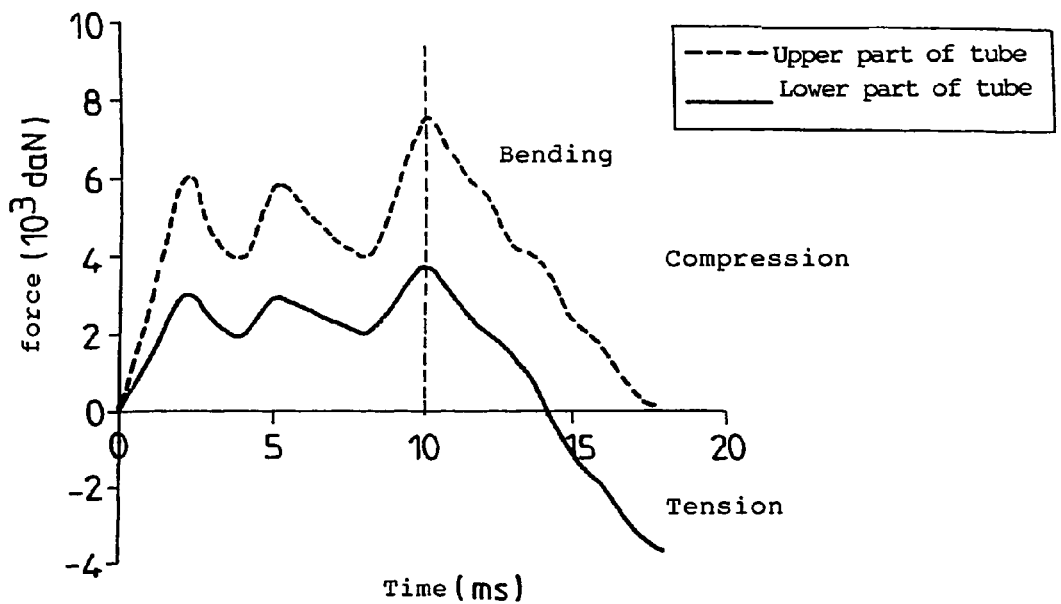
FIGS. 21A, 21B and 21C are respectively a graph of force over time, a graph of force over degree of crushing, and a graph showing the energy absorbed over time during the deformation of the first part according to FIGS. 19 and 20.

For its part, FIG. 21A shows the force measured as a function of time, in a broken line for the upper part of the tube, and in a solid line for its lower part, this force passing through a section normal to the axis of the tube. As abscissa, time is counted in milliseconds. As ordinates, the force F is counted in thousands of daN.

On the curves of "effort/time" and "effort/degree of crushing", the phenomenon of bending starts when the curve "plunges" towards the 0 or negative values, i.e. after the 3rd crest. In the graphs, the vertical broken line is a mark on the axis of the X axes (about 10 ms in time, or 120 mm in degree of crushing) and not the starting point of bending.

Three crests can be seen, which may be considered as immediately preceding the formation of the three folds in the tube, which are shown consecutively in FIGS. 19B to 19D, as well as 20B to 20D. At this stage, the tube bunches. From about 2 milliseconds, the distance between the curves remains almost constant at 3000 daN. It may be considered that the oscillations of these curves "accompany" the successive coming into play of the different perforations.

Beyond 10 ms, the lower face moves into tension, which corresponds to strong bending. More precisely, the force resulting on the lower face becomes a tension from the moment when the contribution to tension due to the torque becomes greater than the contribution due to the compression force.

Figure 21B:
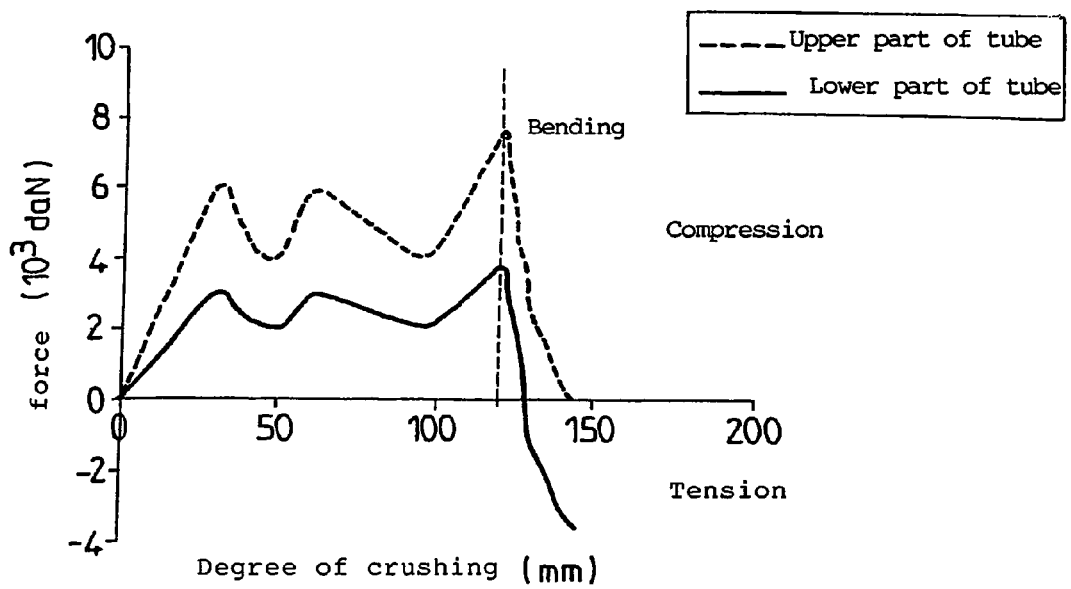

The force/degree of crushing curve of FIG. 21B shows well that the part has much less resistance in the bending phase.

Figure 21C:
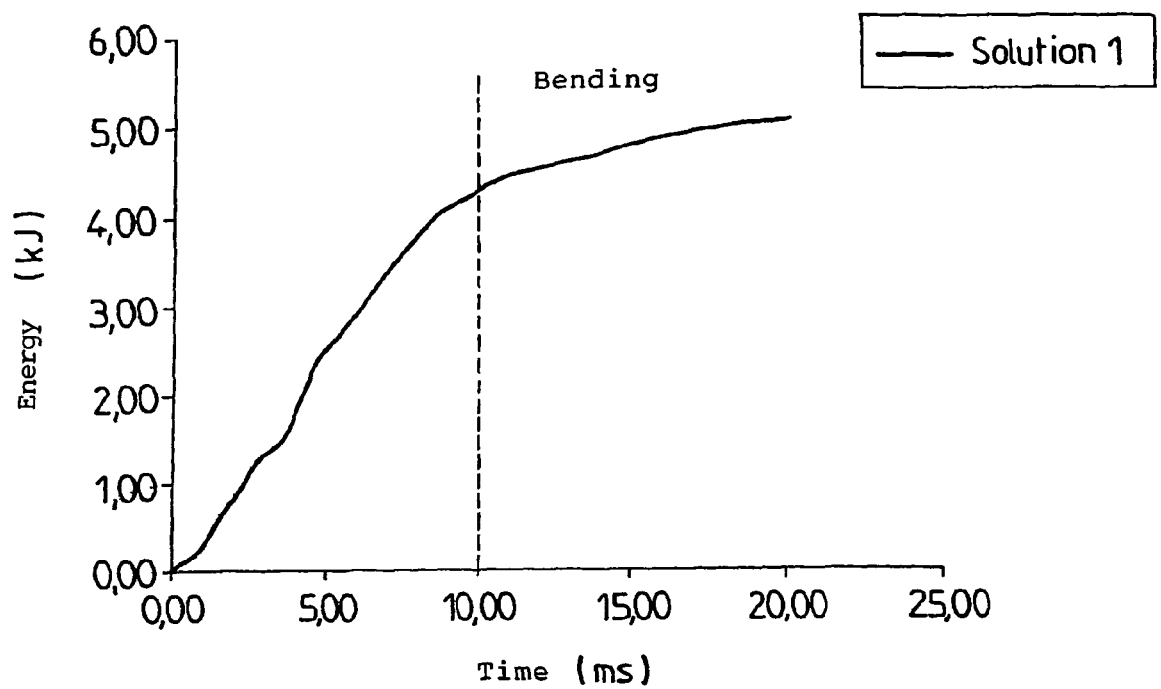

Correspondingly, the curve of cumulative energy absorbed in FIG. 21C shows that the energy absorbed reaches the upper limit at about 4.5 kiloJoules when the bending phase is entered, whereas it remains very close to being linear.

It should be noted that the part is held as if on the vehicle, but without the whole of the chassis surrounding the same. In a "full" crash phenomenon (taking into account other components forming the vehicle and also absorbing energy upon their deformation), the energy absorbed is greater than that measured here.

Figure 24A:
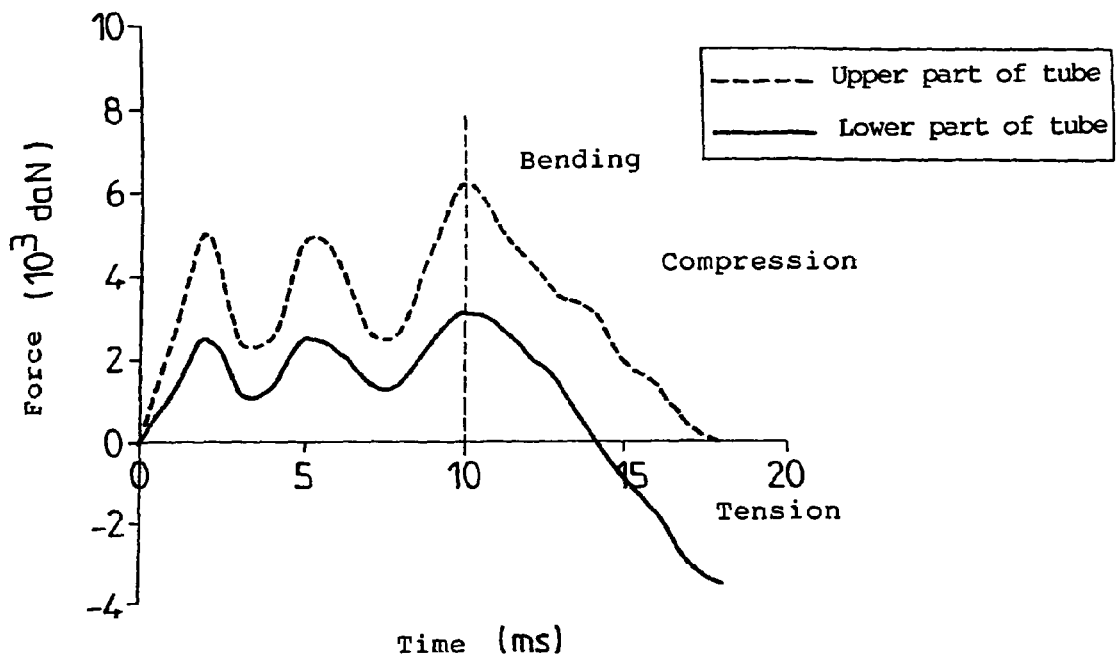
FIGS. 24A, 24B and 24C are respectively a graph showing force over time, a graph of force over degree of crushing, and a graph of energy absorbed over time, during deformation of the second part according to FIGS. 22 and 23.
Figure 24B:
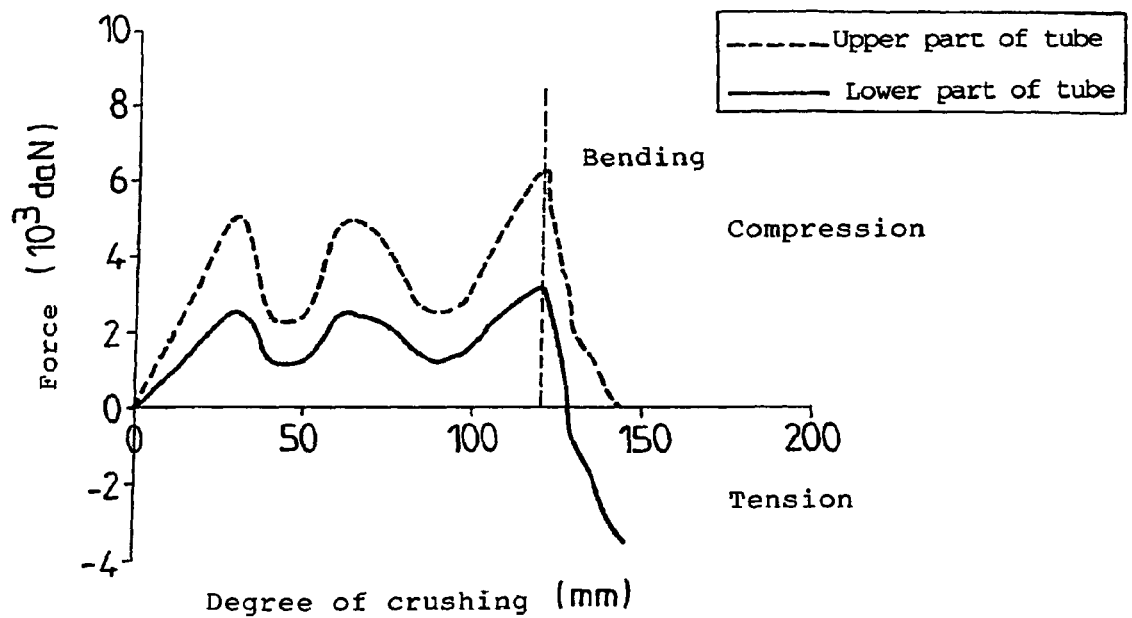

The behavior of a second part is shown in FIGS. 22 to 24, which are drawn up like the previous ones, and whose form will therefore not be described in detail.

This second part has two pairs of similar perforations provided on two side faces of the tube, and a pair of perforations, homologous to the first in position, located on the lower face of the tube.

From about 2 milliseconds, the gap between the curves remains roughly constant in a fork of 2500 to 3000-daN.

Figure 24C:
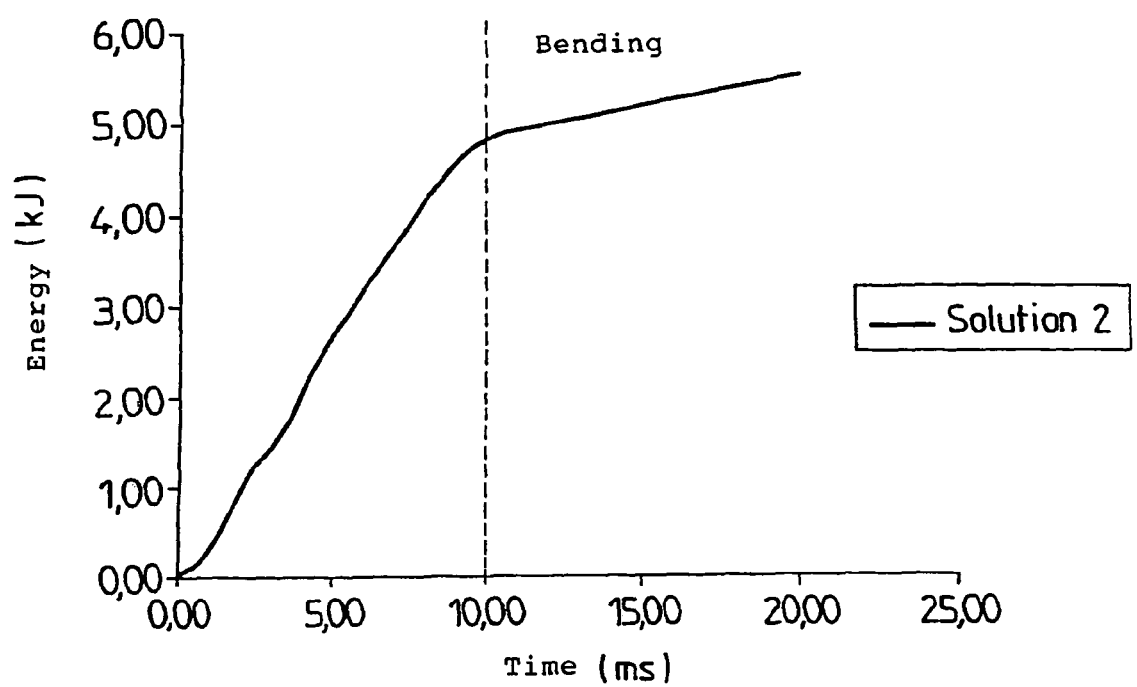

This time, the curve of cumulative energy absorbed in FIG. 24C shows that the energy absorbed reaches the upper limit at about 5 kiloJoules when bending starts. Before that point, it remains very close to being linear.

Figure 27A:
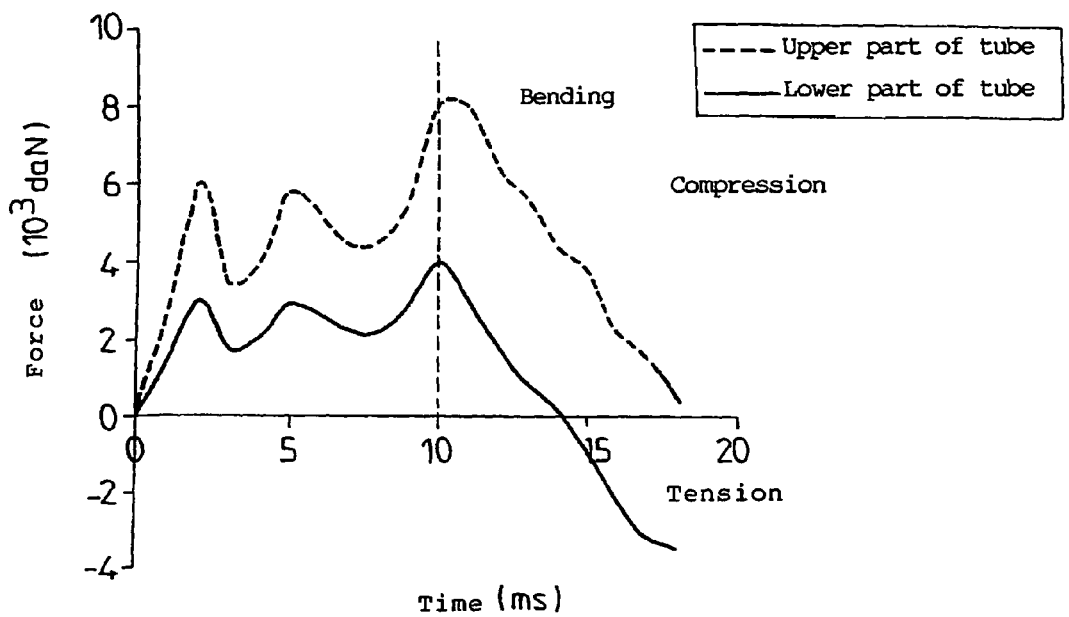
FIGS. 27A, 27B and 27C are respectively a graph of force over time, a graph of force over degree of crushing, and a graph of energy absorbed over time, during deformation of the third part according to FIGS. 25 and 26.
Figure 27B:
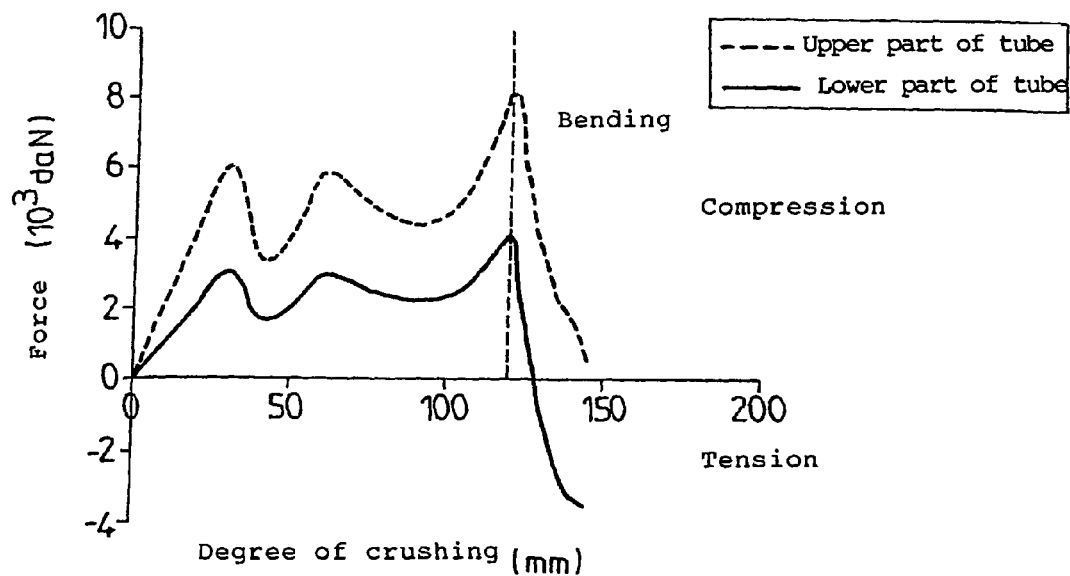

The behavior of a third part is shown in FIGS. 25 to 27, which are drawn up like those above, and the form of which will therefore not be described in detail.

This third part has two perforations formed consecutively in the lower face of the tube.

It will be seen that it is possible to obtain with this third tube a law of force where the gap between the high curve and the low curve from 2 ms onward is almost the same as for the first tube. The general rate of the curve is slightly different.

Figure 27C:
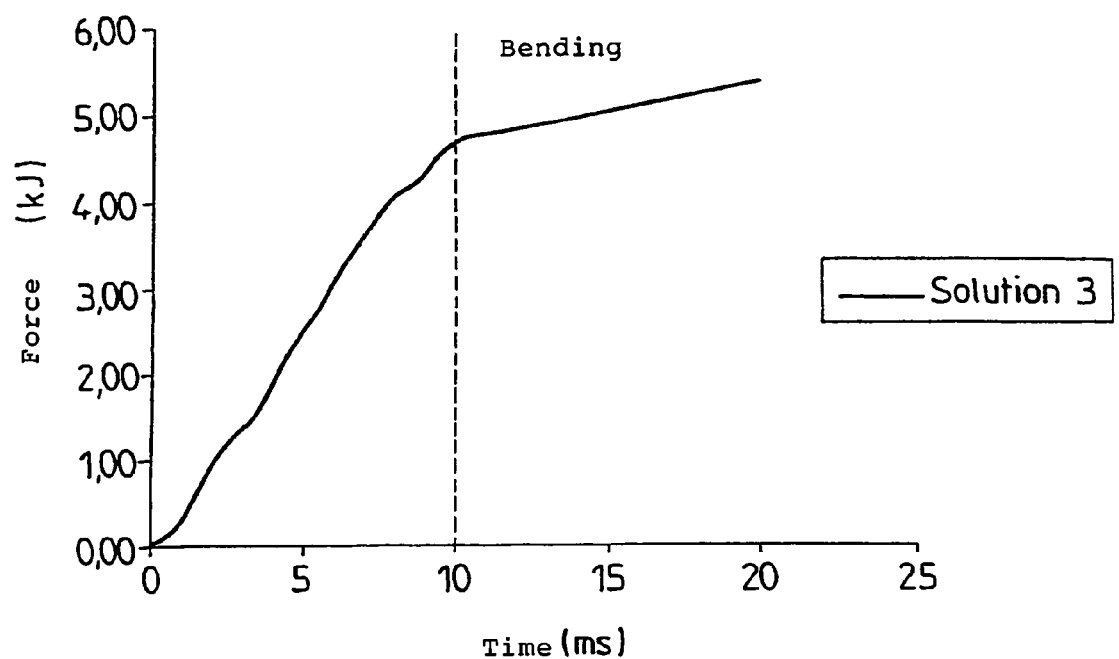

The curve of cumulative energy absorbed of FIG. 27C shows that the energy absorbed reaches an upper limit at about 5 kiloJoules when bending starts, as for the second tube. Before that point, it remains very close to being linear.

Figure 30A:
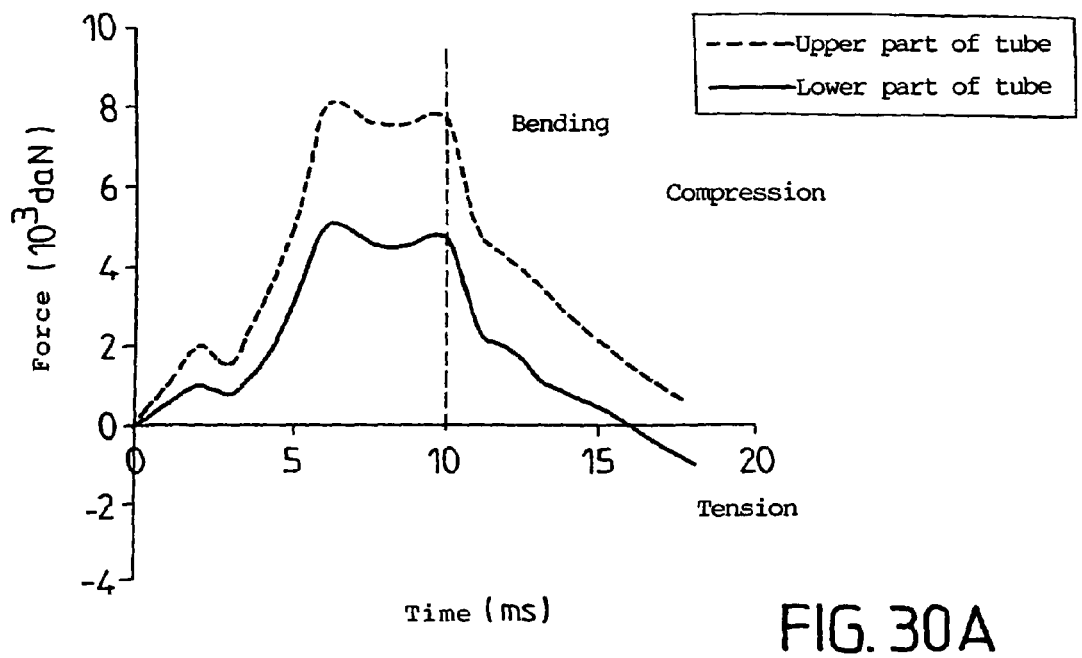
FIGS. 30A, 30B and 30C are respectively a graph of force over time, a graph of force over the degree of crushing, and a graph of energy absorbed over time during the deformation of the fourth part according to FIGS. 28 and 29.
Figure 30B:
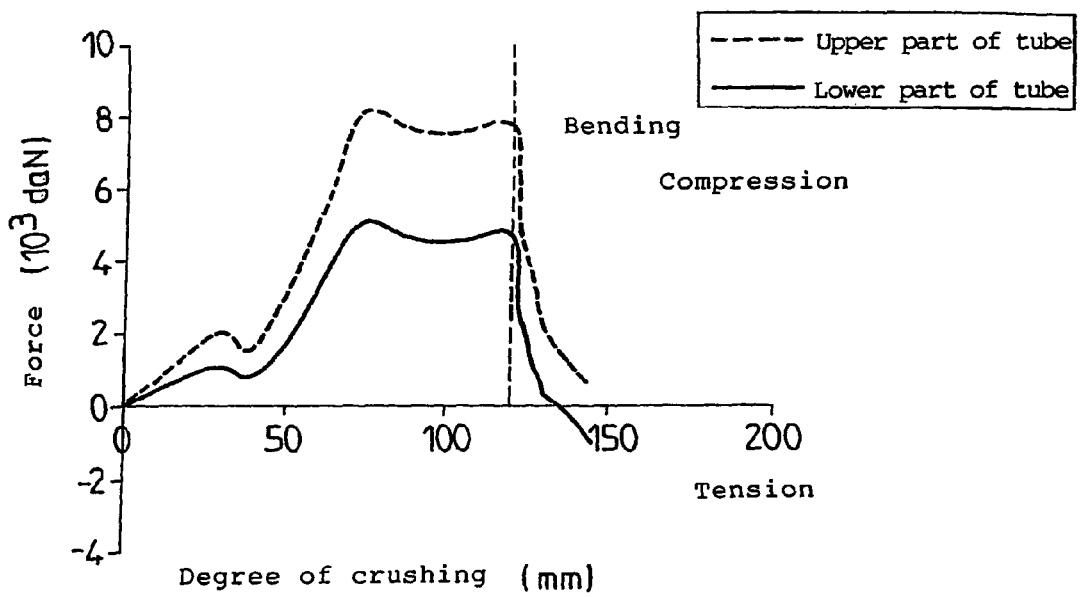

The behavior of a fourth part is shown in FIGS. 28 to 30, of which only the results will be discussed.

This fourth part has four perforations placed substantially at the same longitudinal level as the four edges or "corners" of the tube. Here also, the side views show that under the force of compression and torque this tube bunches, then bends.

For this fourth tube it is found that it is possible to obtain a law of force where the gap between the high curve and the low curve is roughly at 3000 daN, but this time, from about 5 ms onward. The peaks of the curve are not very distinct and the force is almost constant between 5 and 10 ms.

Figure 30C:
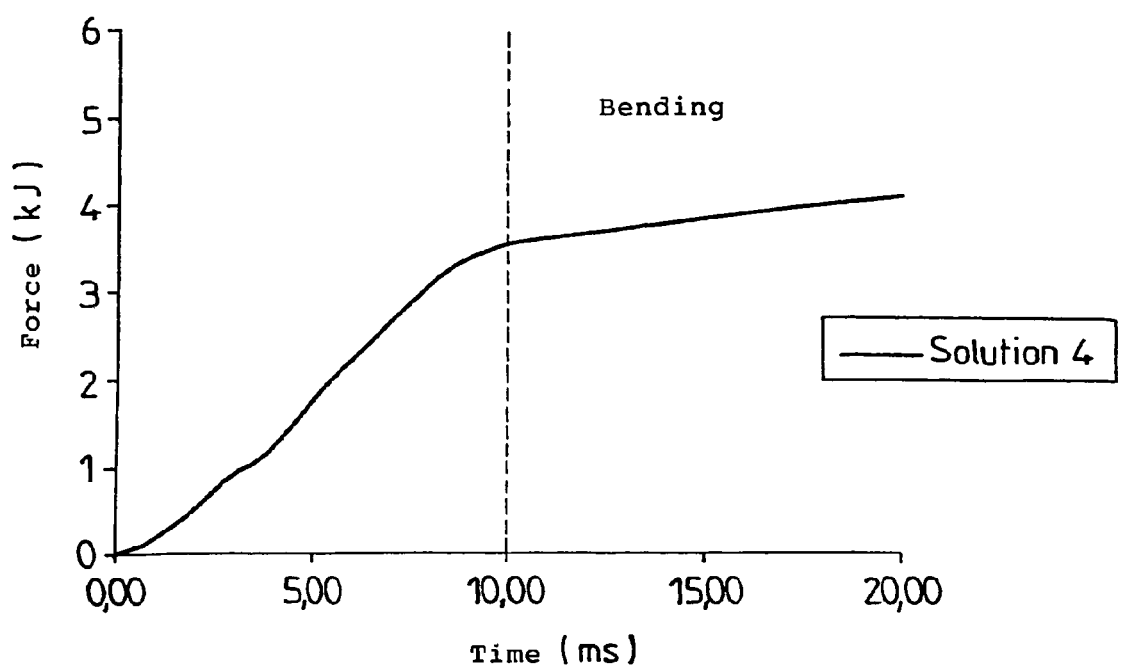

The curve of cumulative energy absorbed in FIG. 30C shows that the energy absorbed reaches an upper limit which is distinctly lower than previously, at about 3.5 kiloJoules.

Figure 33A:
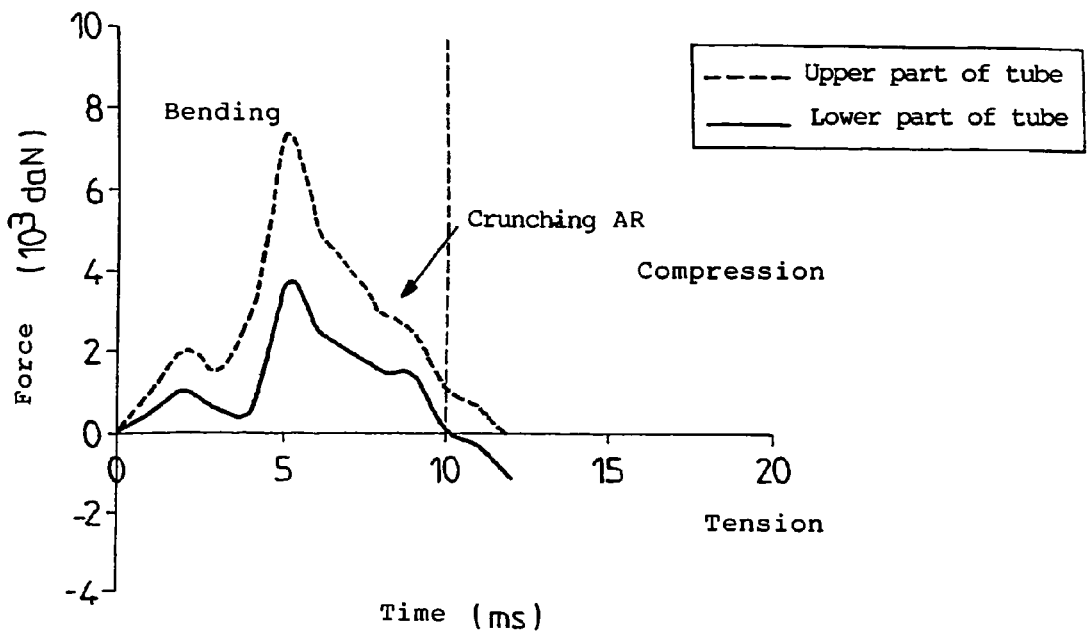
FIGS. 33A, 33B and 33C are respectively a graph of force over time, a graph of force over degree of crushing, and a graph of energy absorbed over time, during deformation of the fifth part according to FIGS. 31 and 32.
Figure 33B:
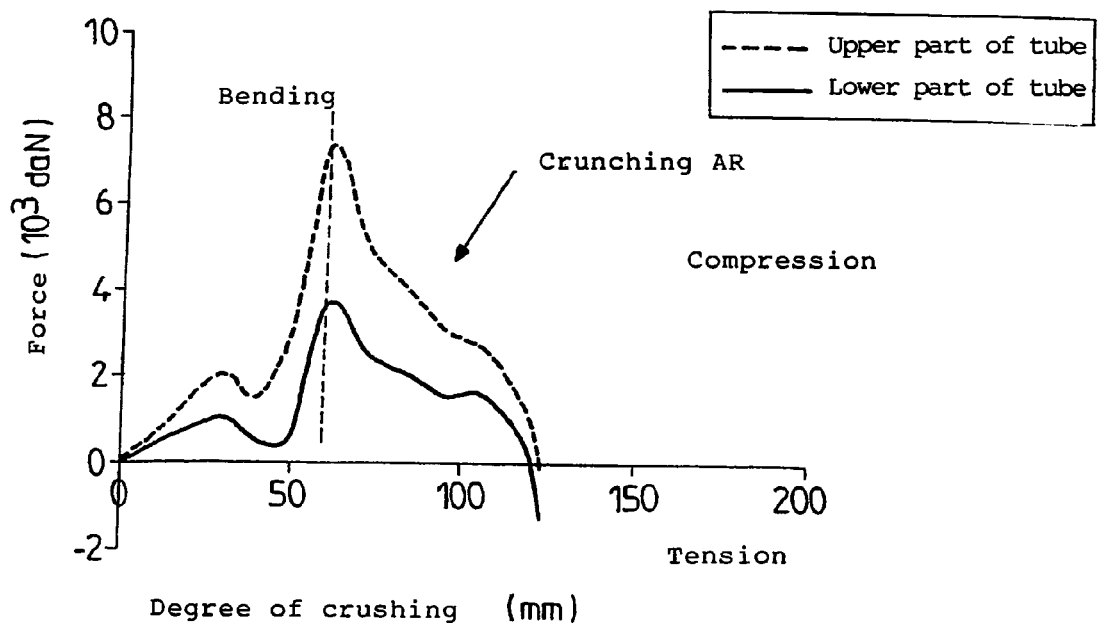
Figure 33C:
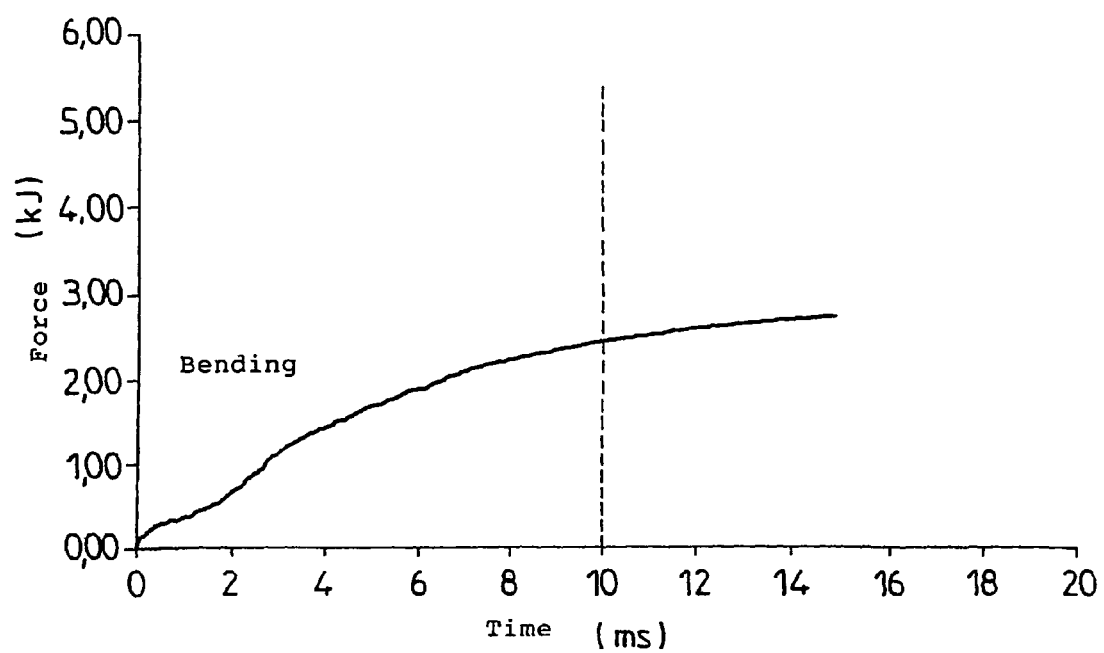

The behavior of a fifth part is shown in FIGS. 31 to 33, of which only the results will be discussed.

This fifth part has four perforations placed substantially at the same longitudinal level on the four faces of the tube. As previously, this tube bunches, then bends.

However, it is found that the bunching stage is shorter, and the bending is accompanied by "crunching", i.e. by the start of a "fold" on the straight portion of the part (see FIGS. 31D and 32D) in a region where no alterations have been formed. This means that in the case of impact, the point where this "crunching" appears is random (cannot be determined), which makes the scenario of deletion of the part unforeseeable, hence there are risks that the consequences of this scenario will be out of control.

The energy absorbed is even lower than previously, since it reaches a ceiling at 2 kiloJoules, with a lack of linearity, and without any real transition being observed between bunching and bending.

It is found that the gap in energy absorbed is significant between the three first parts and the two last parts, and that the energy absorbed during simple bending is of the order of 3 kiloJoules.

Where it is essential to absorb as much energy as possible, asymmetrical perforations will therefore be preferred, as are described in the first three, perforated tubes. Obviously, the examples described are purely illustrative, and it is possible to combine holes on the edge and on faces, retaining the asymmetrical quality, at least partially if this is desired. It is advantageous in particular to leave sufficient material to retain the rigidity of the part; this can be determined in a known manner.

The number of perforations per section depends on the force peak allowed for and on the torque to be countered. The energy absorbed by the tube is conditioned by the dimensions of the tube and the alterations.

In the above, alterations by deformation (indentations) have been described, as well as alterations by apertures ("perforations" or "holes"), or combinations thereof. In fact, as already mentioned, it is possible to combine deformations and perforations, in this case also with or without the asymmetrical quality.

In the current state of its research, Applicant estimates that the use of perforations or holes seems to make it possible to re-orient the force in the part, whereas the use of deformations or indentations seems to permit improved bunching of the part.

The effects will depend obviously on the dimensions of the section. In fact, if the size of the part is increased in the straight section, it is found that the force withstood by the part increases, as well as the energy that it can absorb. In practice, it is the room available to house the part that will determine its size in the straight section, notwithstanding checking the absence of any buckling.

Furthermore, various materials can be used. In the first instance, metal materials are considered. It is currently conceivable to work with different grades of steel and aluminium, such as those used for example in the car industry, or composite materials such as for example plastics containing glass or carbon fibres.

Applicant has also carried out comparisons between parts having different geometries or shapes of straight section, with a substantially constant perimeter. This corresponds to profiles whose respective shapes are, in the geometric sense of these terms, cylindrical surfaces with a substantially circular, square, rectangular, hexagonal or octagonal base for example (the word "substantially" means in particular that the corners are rounded if necessary). In spite of these differences in behavior in detail, it seems that these forms are roughly equivalent, provided that the symmetry of revolution is kept to relatively close (a relatively flat rectangular being considered as verifying this condition).

These observations link up with the question of slenderness mentioned above.

On another plane, it has been found possible to adjust the dimensions of the priming points with a view to optimising the performance of the part taking into account the desired levels of force and energy absorbed.

A compromise can be found according to the following considerations:

- it is advantageous to increase the mechanical resistance of the material, in particular at the end of elastic limit, since the results are then better in the case of bunching,
- on the other hand, the higher these mechanical properties of the material, the greater the risk of instability of the part in the straight section,
- however, it may be important to use a material with a very high elastic limit (e.g. what is known as THLE steel) in the zones of a vehicle which must resist without deformation in the case of an impact, such as the passenger cell for example, which forms the survival space for the passengers.

However, the above description is concerned essentially with a part which is for example, as has been indicated, an extension for the car. It is necessary to bear in mind that in practice this extension will be preceded by a shock absorber, which may take on the whole resistance for an interval of time corresponding approximately to the first ten first milliseconds after the impact. Obviously, the invention can also apply to other component parts of a car, according to the properties of resistance to shock which are required of them.

Finally, in order to increase the amount of energy absorbed, it is advantageous to increase the number of alterations generating the phenomenon of bunching which has the effect of increasing substantially in the same proportion the number of bunching "folds" at the time of the impact, and consequently the energy absorbed. The number of alterations must however be limited in order to preserve the stability of the bunching which must take place along the axis of the tube.

Appendix 1—Formulae $$\lambda = \frac{L}{\sqrt{I\min/S}} \quad [I]$$

$$F = k \frac{\prod 2 E I\min}{L^2} \quad [II]$$

The invention claimed is:

1. A mechanical device, comprising:
   an elongate structural element, configured to absorb at least partially impacts by deformation,
   wherein the structural element comprises a profile of a selected straight section, the profile including localized alterations that are shaped and that are positioned on said selected straight section such that, when the selected straight section of the structural element is subjected to a combined force of compression in a longitudinal axis of the structural element and torque having an axis perpendicular to a plane passing through the longitudinal axis, the selected straight section undergoes two sequential phases of deformation,
   wherein the two sequential phases of deformation include a first phase of energy absorption by bunching of the selected straight section followed by a second phase of bending of the selected straight section,
   wherein the localized alterations are shaped and are positioned on the selected straight section such that the bending of the second phase occurs at the same place on the selected straight section of the structural element as the bunching of the first phase,
   wherein at least some of the alterations are asymmetrical with respect to opposing portions of said structural element along the longitudinal axis, and
   wherein said alterations comprise deformations formed in said structural element prior to the selected straight section undergoing said two sequential phases of deformation.

2. A device according to claim 1, wherein at least some of the alterations are non-uniform in the straight section.

3. A device according to claim 1, wherein at least some of the alterations are formed with a substantially constant perimeter.

4. A device according to claim 1, wherein at least one of the alterations is oriented at an oblique angle.

5. A device according to claim 1, wherein at least some of the alterations are formed on one or more edges of the structural element.

6. A device according to claim 1, wherein at least some of the alterations are formed on one or more faces of the structural element.

7. A device according to claim 1, wherein the structural element comprises a tube.

8. A device according to claim 1, wherein the profile has a general shape of a straight cylindrical surface.

9. A device according to claim 1, wherein the structural element has a slenderness of more than about 25.

10. A device according to claim 1, comprising a low path of a front part of a vehicle, with at least one extension between a cradle and a front structure, wherein the extension comprises the structural element.

11. A device according to claim 10, wherein the extension is substantially fixed at one end.

12. A device according to claim 1, wherein said mechanical device comprises a mechanical brace device for a vehicle.

13. A device according to claim 1, wherein at least one of said deformations has a hole formed therein.

14. A device according to claim 1, wherein said alterations comprise shaping alterations formed solely by shaping of said straight section.

15. A mechanical device, comprising:
    an elongate structural element, configured to absorb at least partially certain impacts by deformation,
    wherein the structural element comprises a profile of a selected straight section, the profile including localized alterations that are shaped and that are positioned on said selected straight section such that, when the selected straight section of the structural element is subjected to a combined force of compression in a longitudinal axis of the structural element and torque having an axis perpendicular to a plane passing through the longitudinal axis, the selected straight section undergoes two sequential phases of deformation,
    wherein the two sequential phases of deformation include a first phase of energy absorption by bunching of the selected straight section followed by a second phase of bending of the selected straight section,
    wherein the localized alterations are shaped and are positioned on the selected straight section such that the bending of the second phase occurs at the same place on the selected straight section of the structural element as the bunching of the first phase, wherein at least one of the alterations has a plurality of apertures formed therein.

16. A mechanical device, comprising:

an elongate structural element, configured to absorb at least partially impacts by deformation, wherein the structural element comprises a profile of a selected straight section, the profile including localized alterations that are shaped and that are positioned on said selected straight section such that, when the selected straight section of the structural element is subjected to a combined force of compression in a longitudinal axis of the structural element and torque having an axis perpendicular to a plane passing through the longitudinal axis, the selected straight section undergoes two sequential phases of deformation, wherein the two sequential phases of deformation include a first phase of energy absorption by bunching of the selected straight section followed by a second phase of bending of the selected straight section, wherein the localized alterations include a first alteration and a second alteration that are axially spaced from each other on the selected straight section, that are respectively shaped and that are respectively positioned on the selected straight section such that the bunching of the first phase occurs at the first alteration and the bending of the second phase occurs at the second alteration, wherein at least some of the localized alterations, including the first alteration, are asymmetrical with respect to opposing portions of said structural element along the longitudinal axis, and wherein each of said localized alterations comprise deformations formed in said structural element prior to the selected straight section undergoing said two sequential phases of deformation.

17. A device according to claim 16, wherein at least one of said deformations has a hole formed therein.

18. A device according to claim 16, wherein said alterations comprise shaping alterations formed solely by shaping of said straight section.

19. A method of absorbing impact by deformation of a mechanical device comprising:

providing an elongate structural element, comprising a profile of a selected straight section, the selected straight section including localized alterations of respectively selected shape and position, applying to the selected straight section a combined force of compression in a longitudinal axis of the selected straight section and a torque having an axis perpendicular to a plane passing through said longitudinal axis such that the selected straight section undergoes two sequential phases of deformation, wherein the two sequential phases of deformation include a first phase of bunching of the selected straight section followed by a second phase of bending of the selected straight section.

20. A mechanical device, comprising:

an elongate structural element, configured to absorb at least partially impacts by deformation, wherein the structural element comprises a profile of a selected straight section, the profile including localized alterations that are shaped and that are positioned on said selected straight section such that, when the selected straight section of the structural element is subjected to a combined force of compression in a longitudinal axis of the structural element and torque having an axis perpendicular to a plane passing through the longitudinal axis, the selected straight section undergoes two sequential phases of deformation, wherein the two sequential phases of deformation include a first phase of energy absorption by bunching of the selected straight section followed by a second phase of bending of the selected straight section, wherein the localized alterations include a first alteration and a second alteration that are axially spaced from each other on the selected straight section, that are respectively shaped and that are respectively positioned on the selected straight section such that the bunching of the first phase occurs at the first alteration and the bending of the second phase occurs at the second alteration, wherein at least some of the localized alterations, including the first alteration, are asymmetrical with respect to opposing portions of said structural element along the longitudinal axis, and wherein at least one of the localized alterations has a plurality of apertures formed therein.

* * * * *